Figure 18:
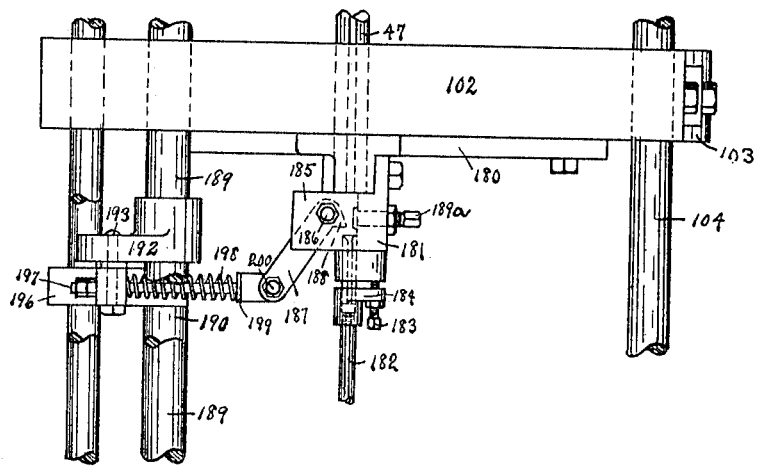

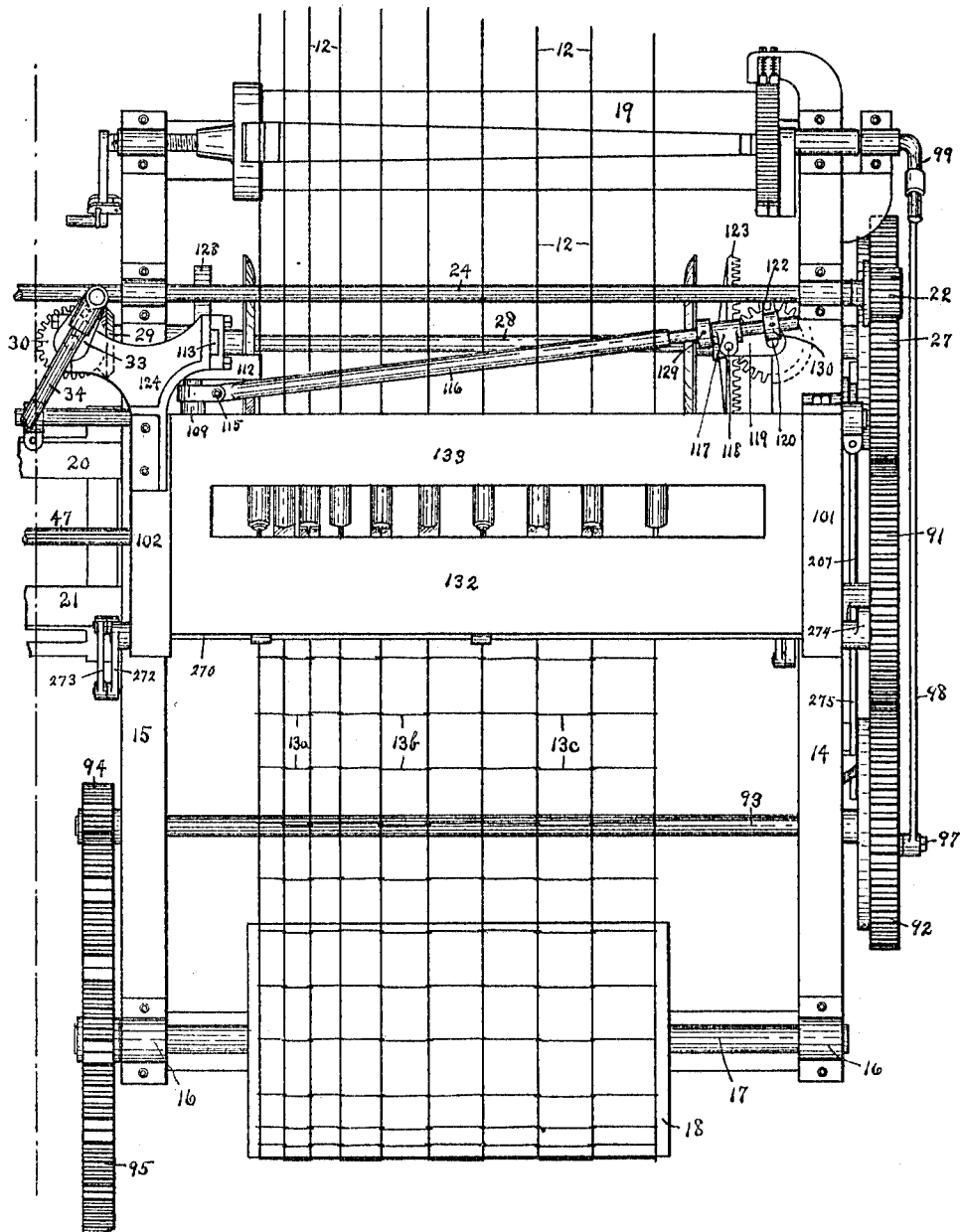
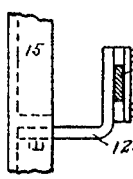

E. W. CORNELL.
FENCE MACHINE.
APPLICATION FILED AUG. 28, 1913.
1,105,622.
Patented Aug. 4, 1914.
22 SHEETS—SHEET 2.
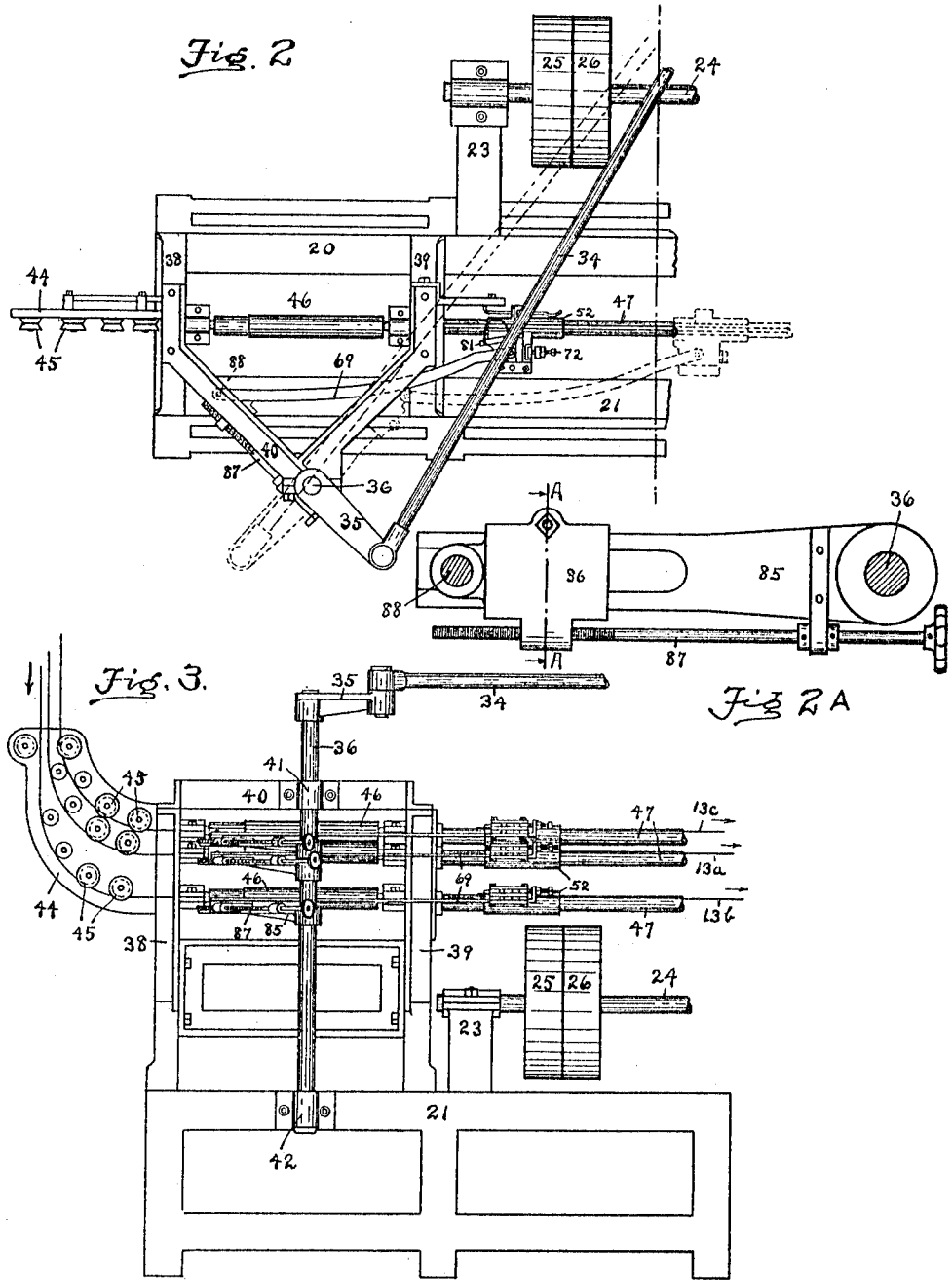
WITNESSES:
INVENTOR
Evan W. Cornell.
BY
Edward N. Pageleien.
ATTORNEY
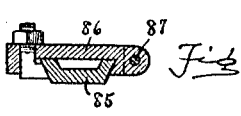

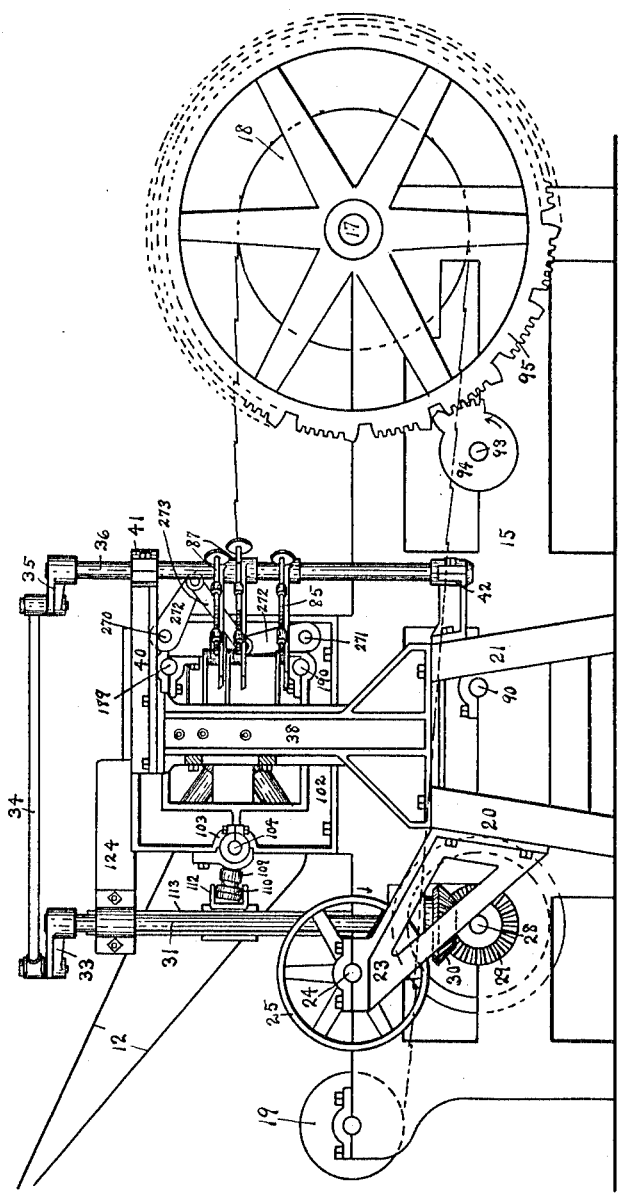

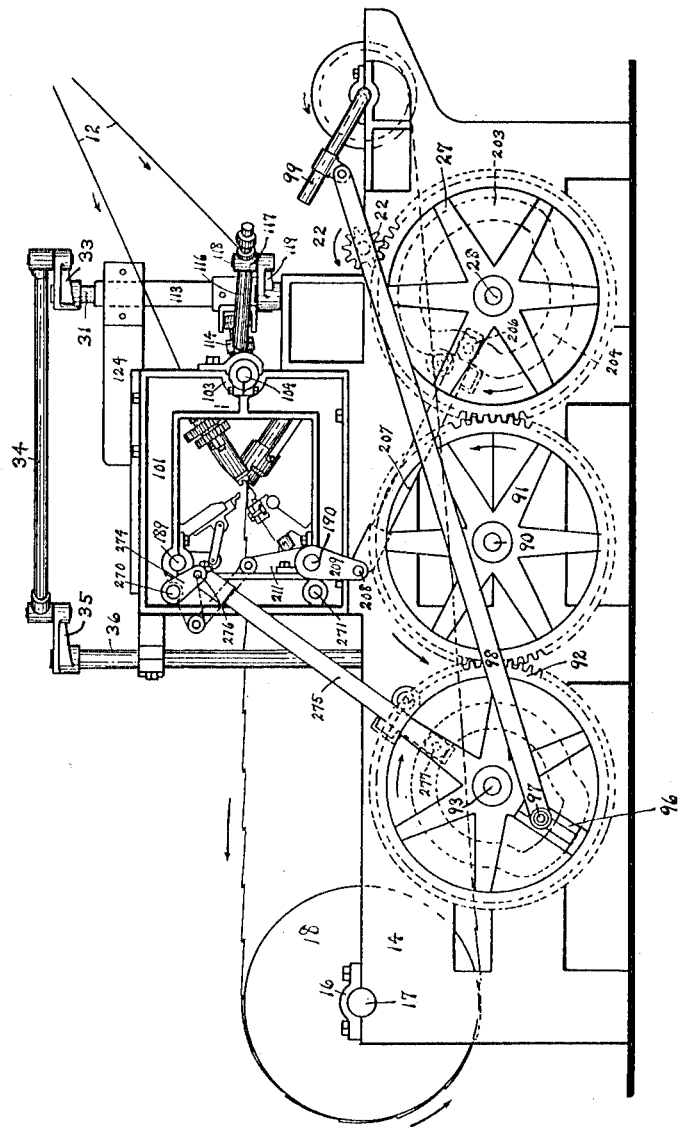

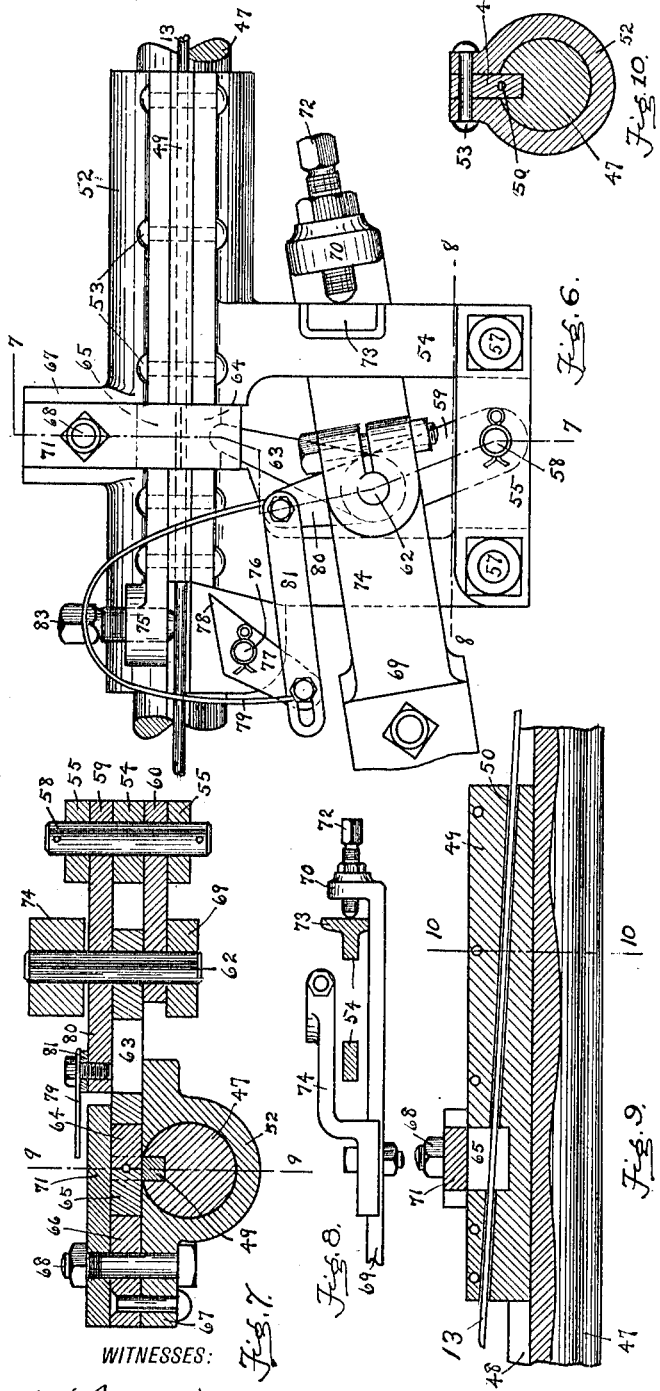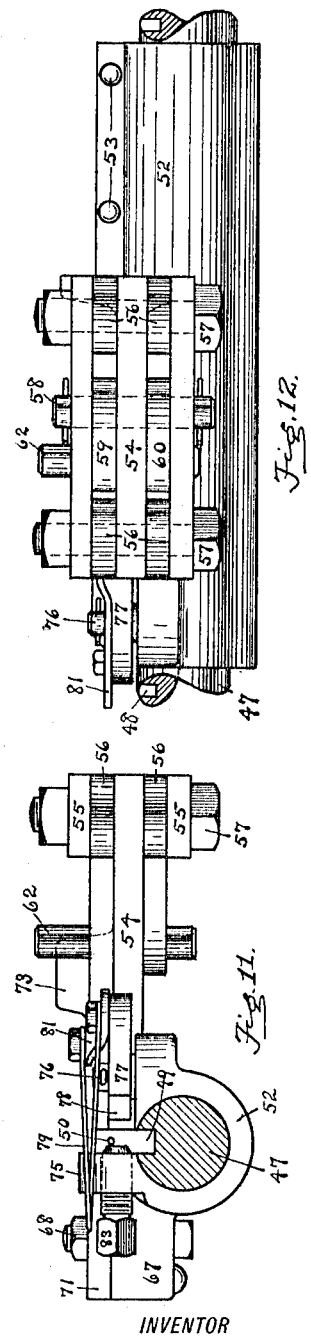

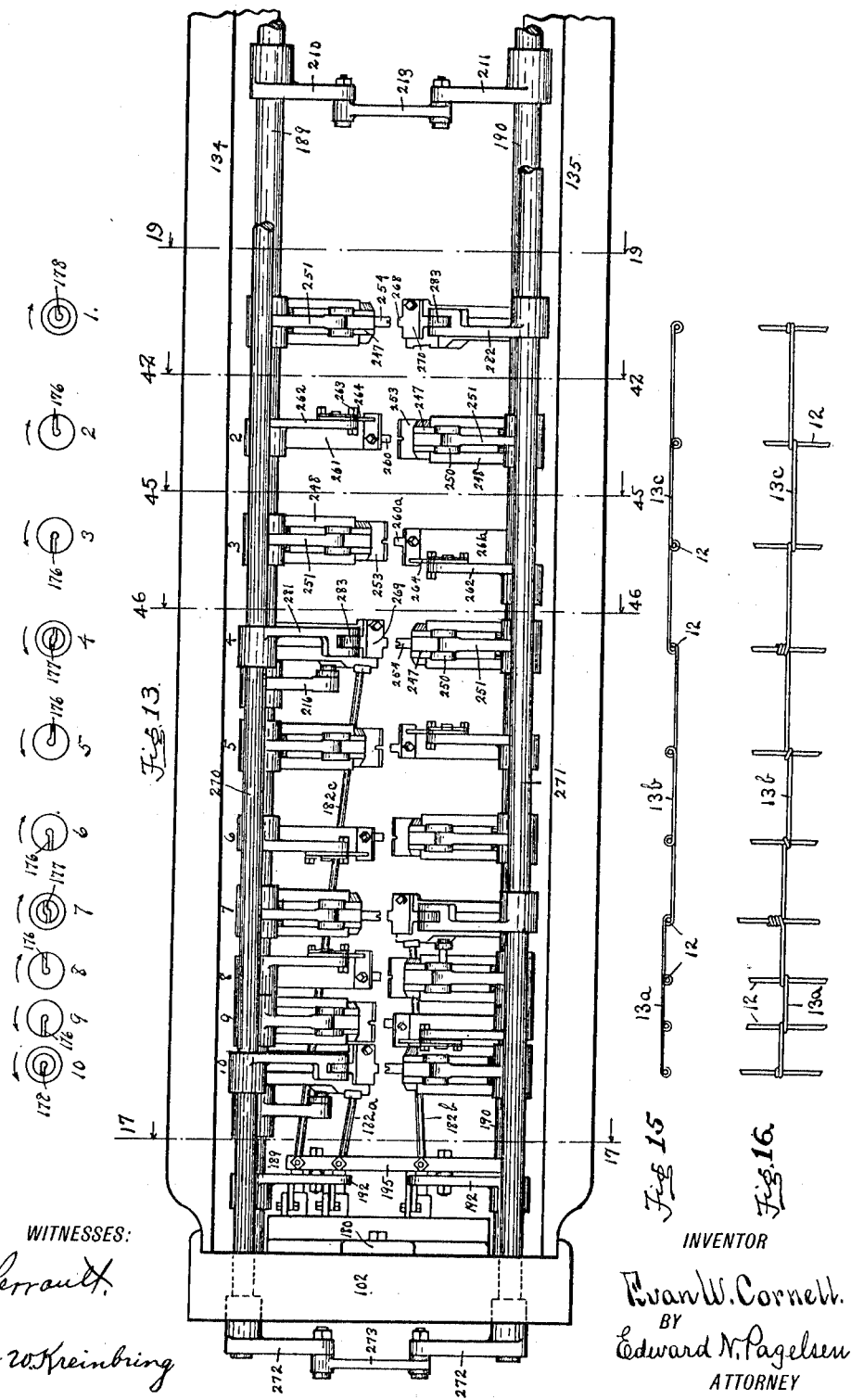

E. W. CORNELL.
FENCE MACHINE.
APPLICATION FILED AUG. 28, 1913.

1,105,622.

Patented Aug. 4, 1914.
22 SHEETS—SHEET 7.

WITNESSES:

INVENTOR
Evan W. Cornell
BY
Edward N. Pagelsen.
ATTORNEY

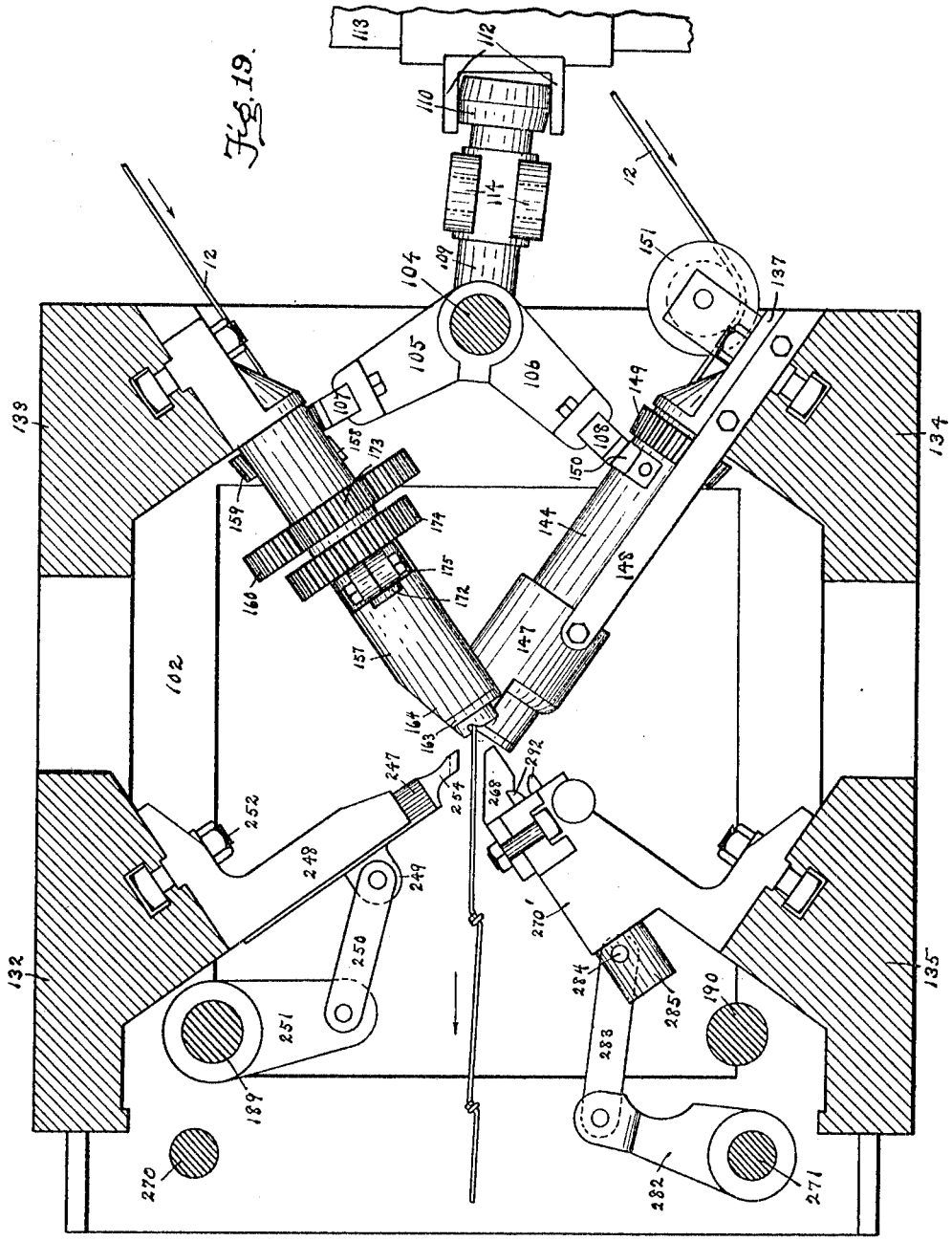

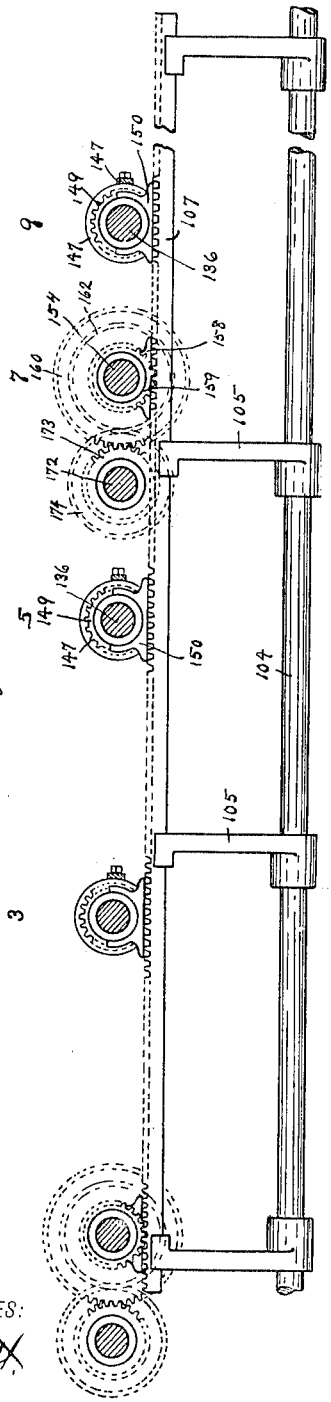

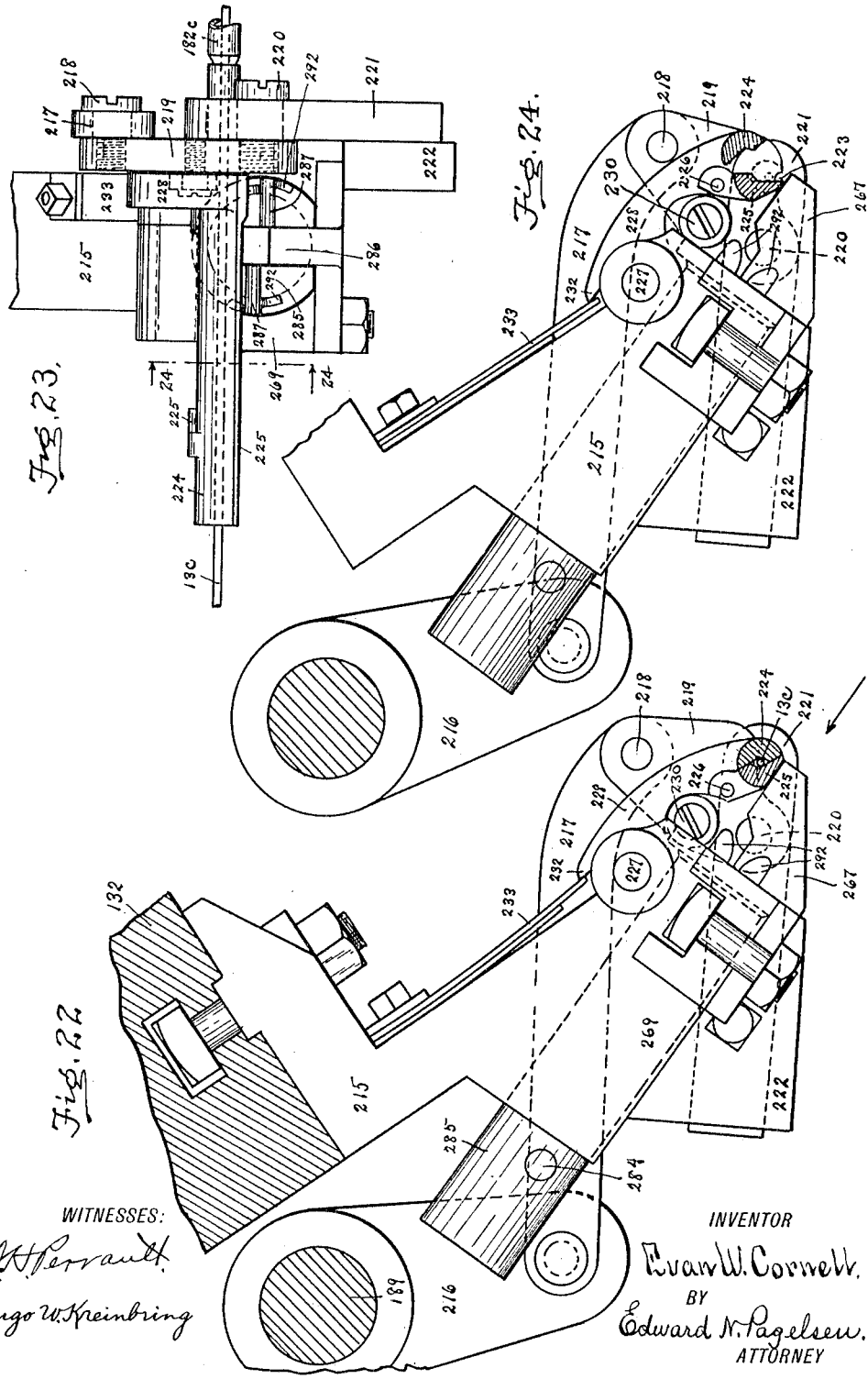

E. W. CORNELL.
FENCE MACHINE.
APPLICATION FILED AUG. 28, 1913.
1,105,622.
Patented Aug. 4, 1914.
22 SHEETS—SHEET 11.
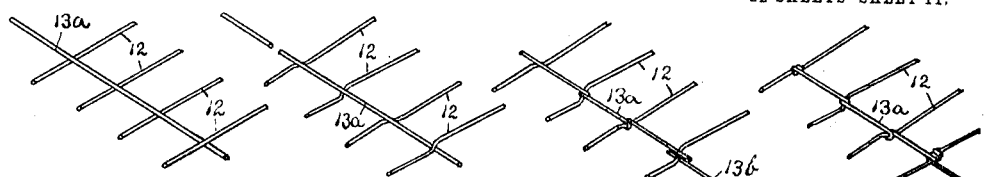
Fig. 25.   Fig. 26.   Fig. 27.   Fig. 28.
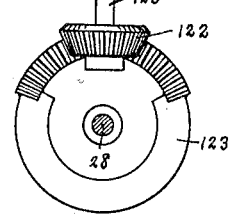 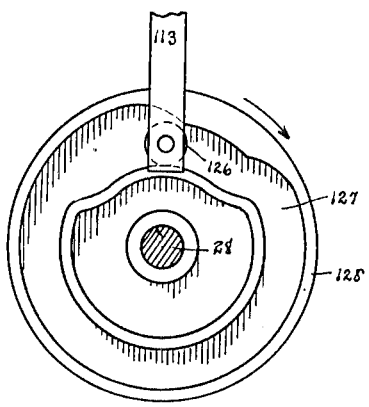
Fig. 53.
Fig. 29.
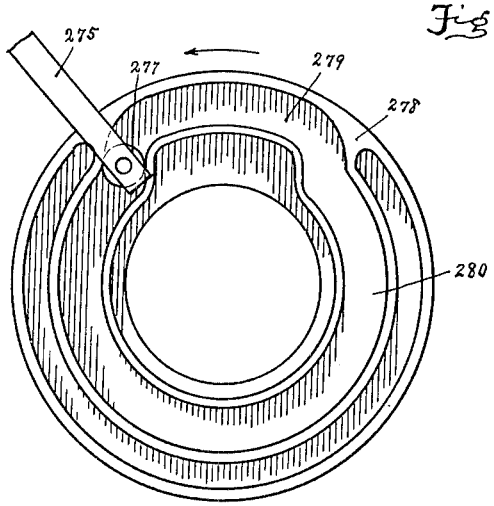 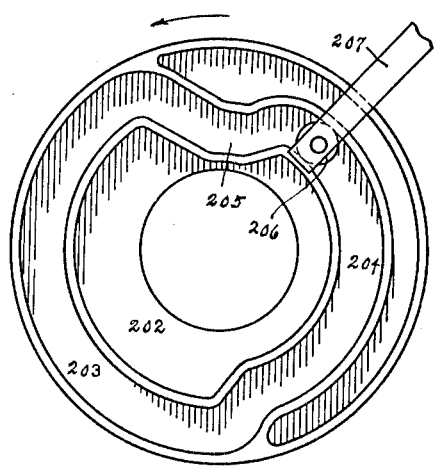
Fig. 30.
Fig. 31.
WITNESSES:
J. H. Perrault
Hugo W. Kreinbring
INVENTOR
Evan W. Cornell
BY
Edward N. Pagelsen.
ATTORNEY

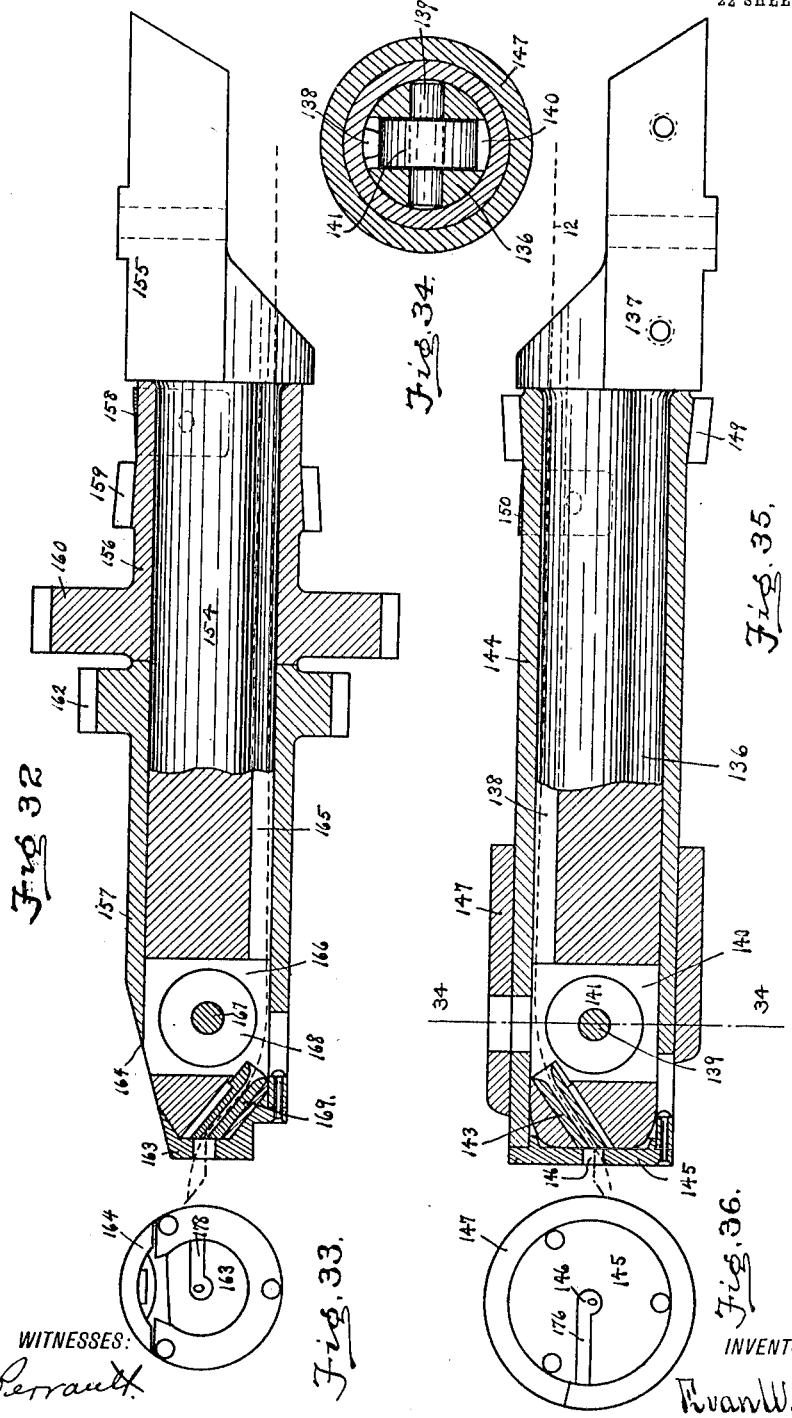

E. W. CORNELL.
FENCE MACHINE.
APPLICATION FILED AUG. 26, 1913.

1,105,622.

Patented Aug. 4, 1914.
22 SHEETS—SHEET 13.

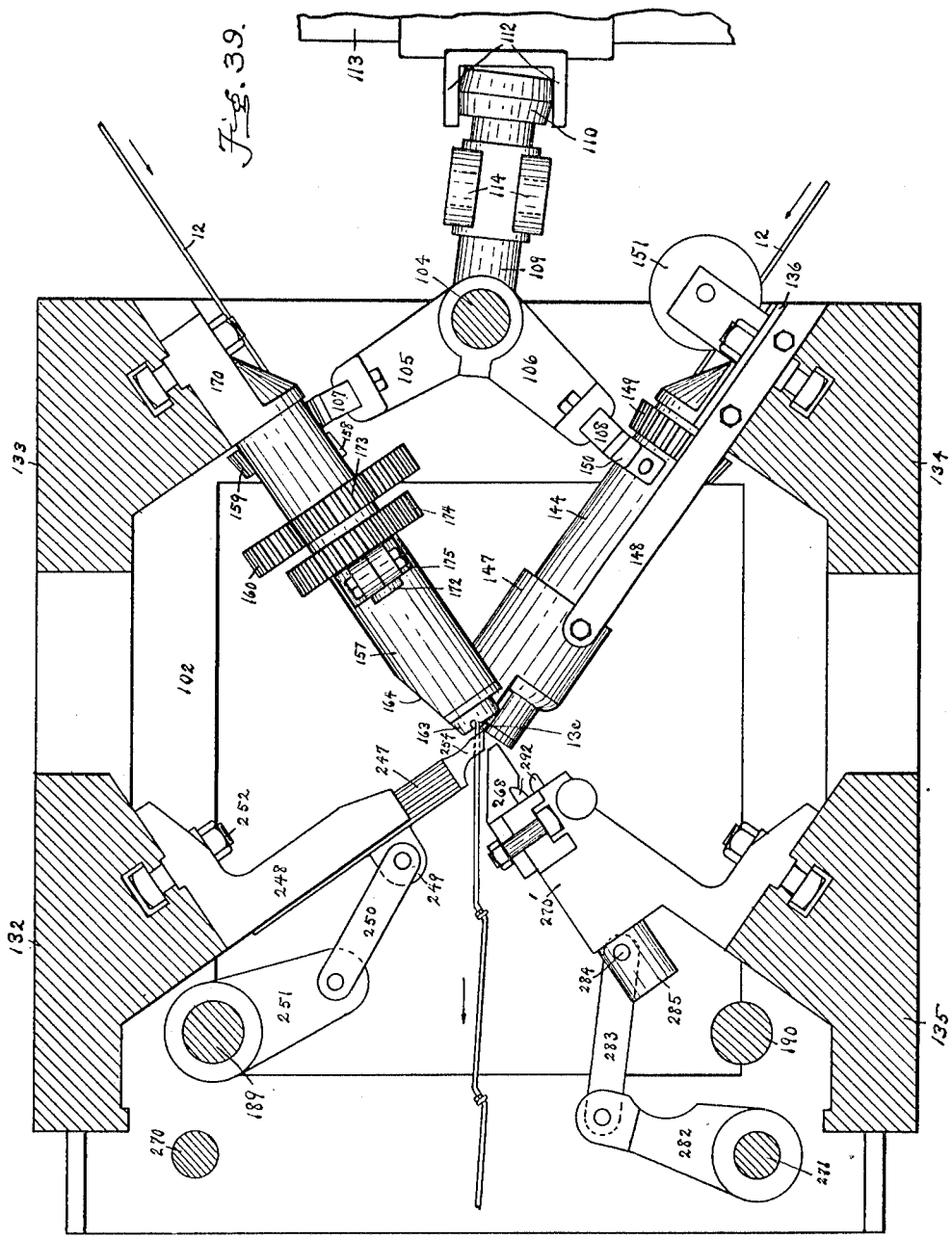

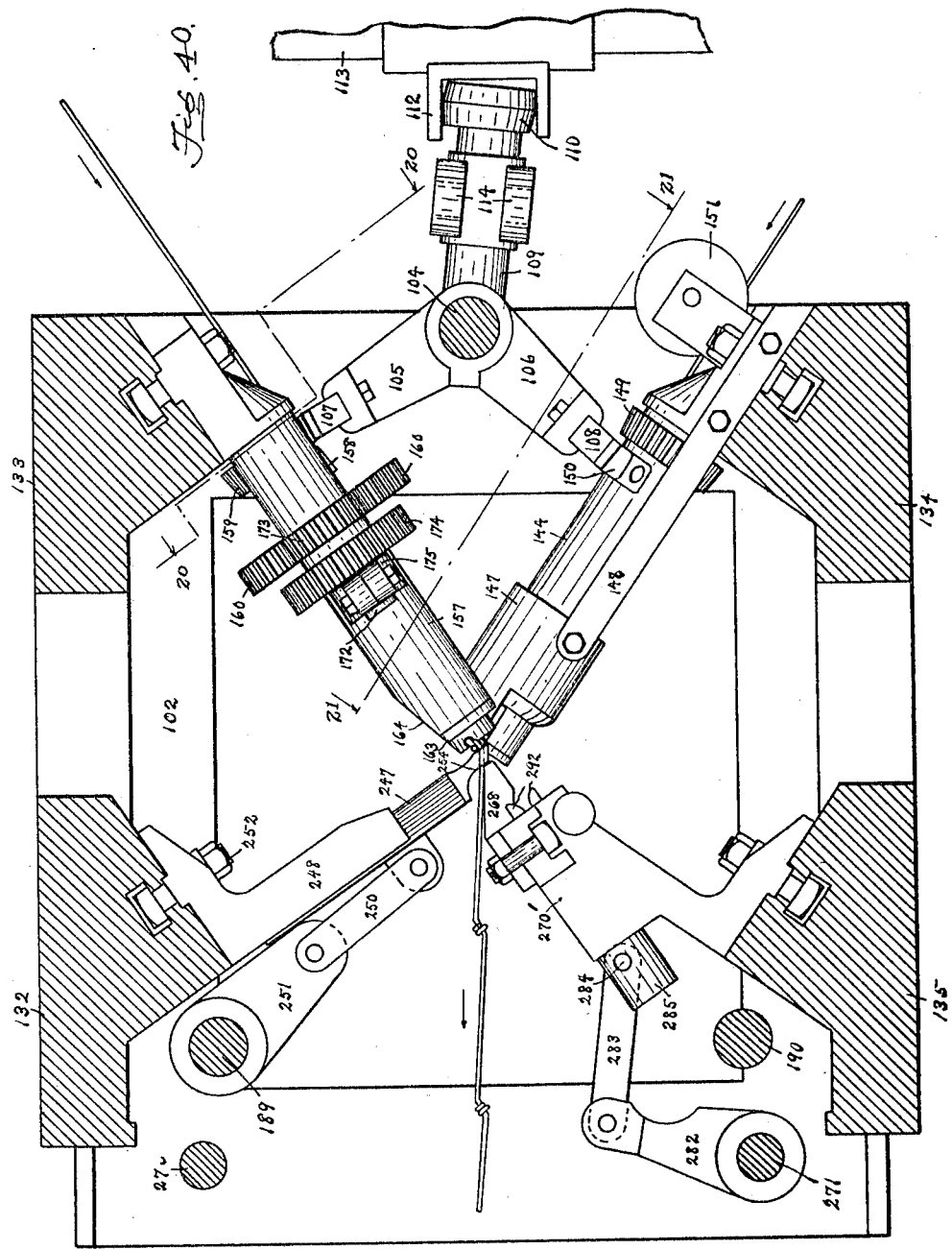

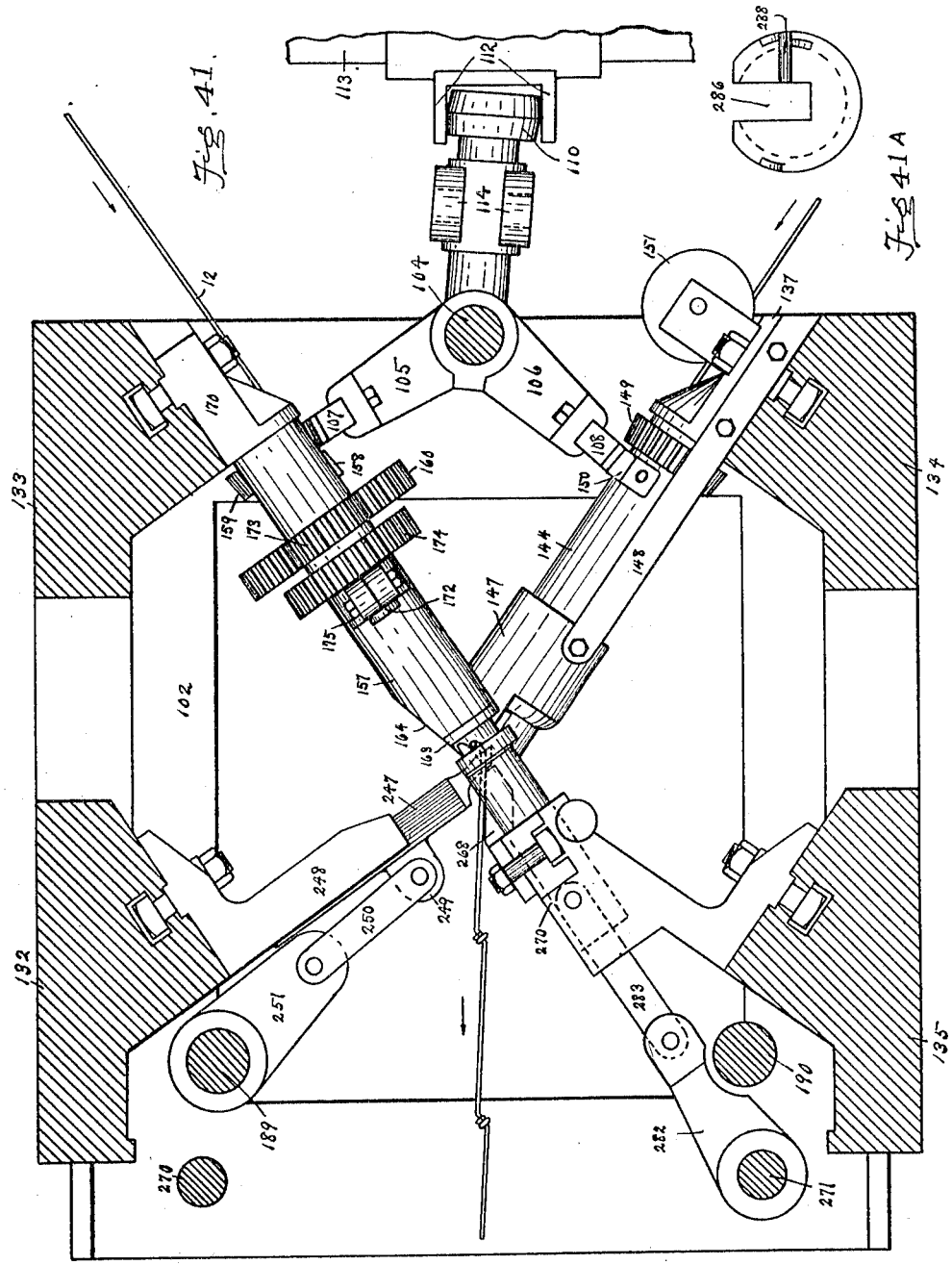

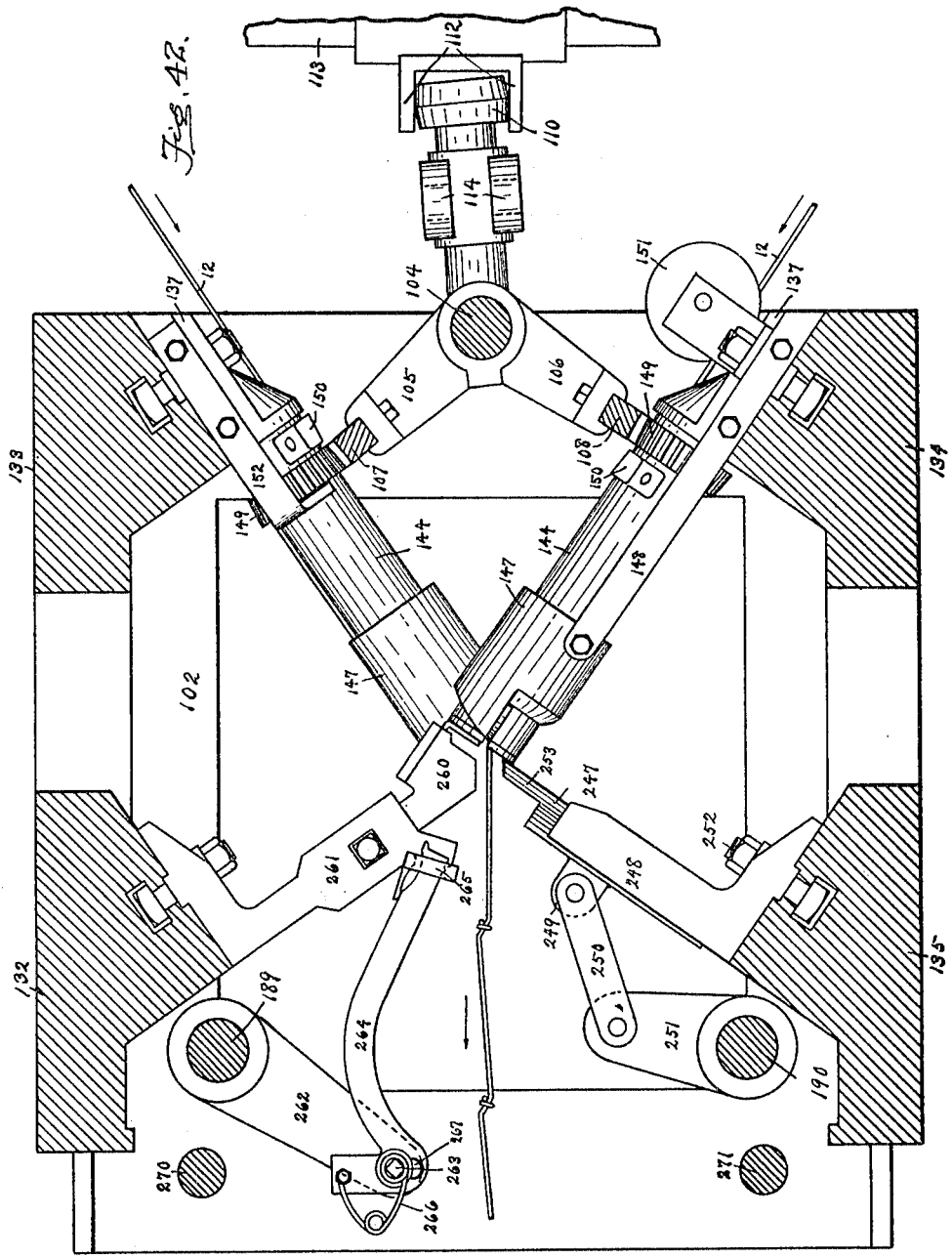

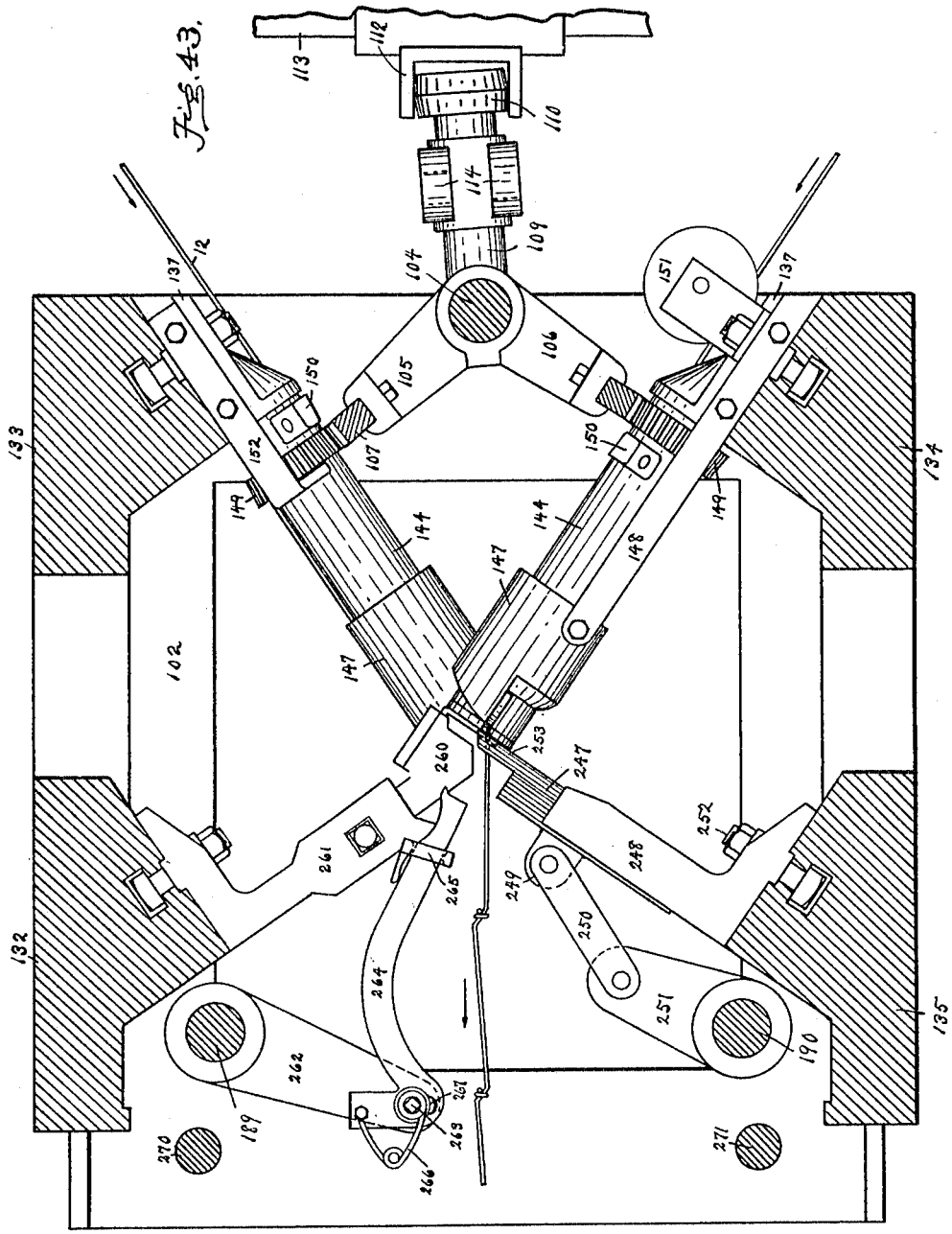

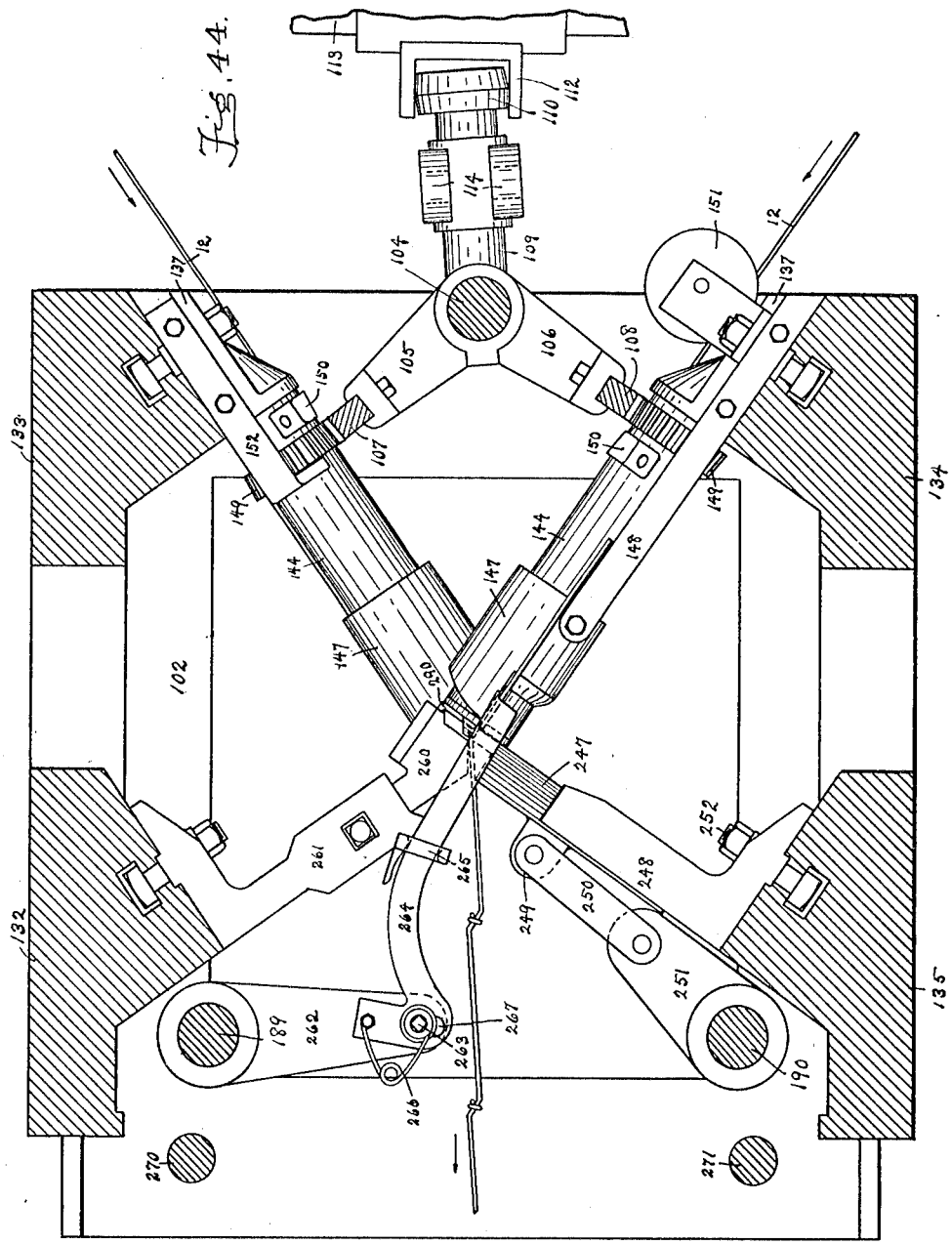

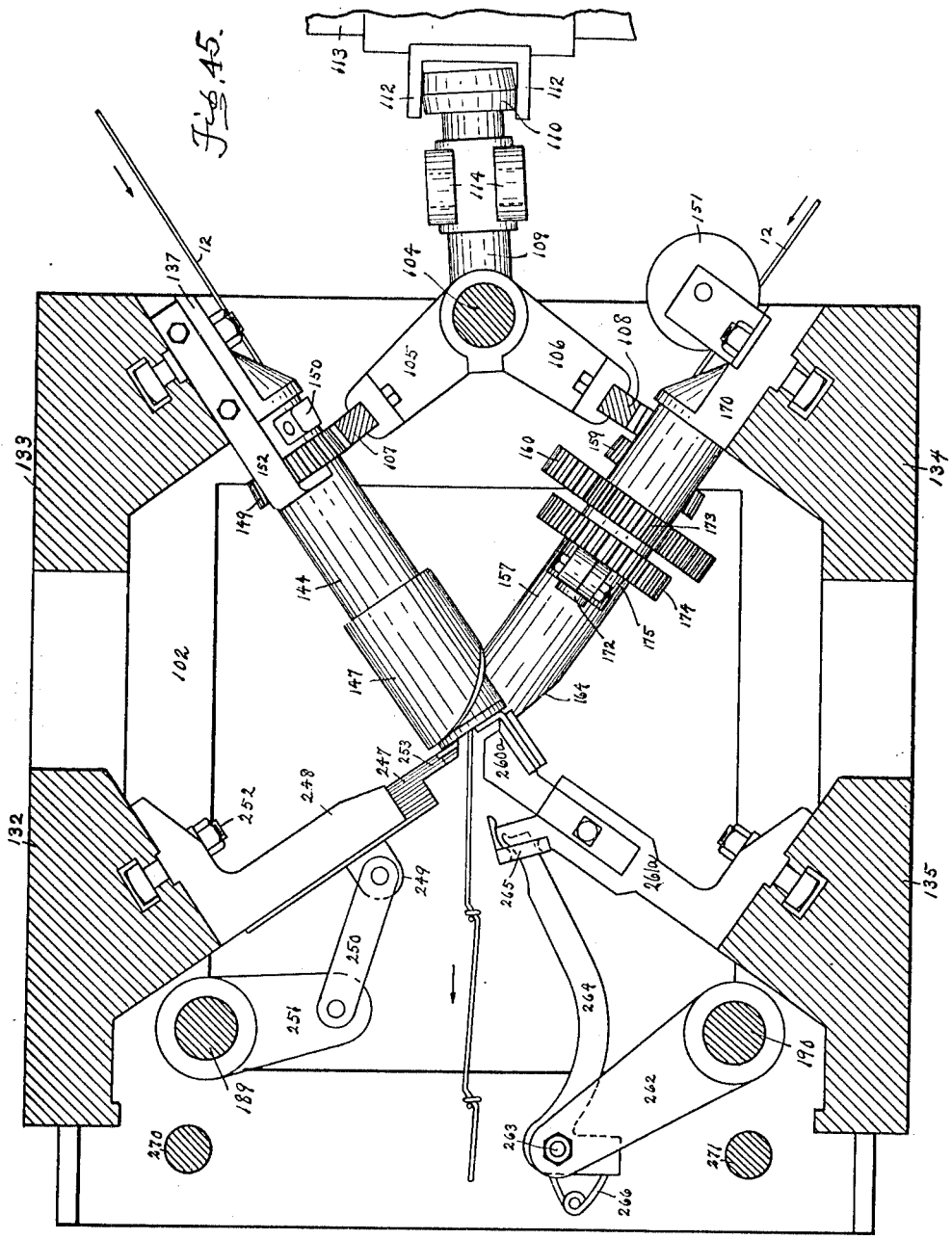

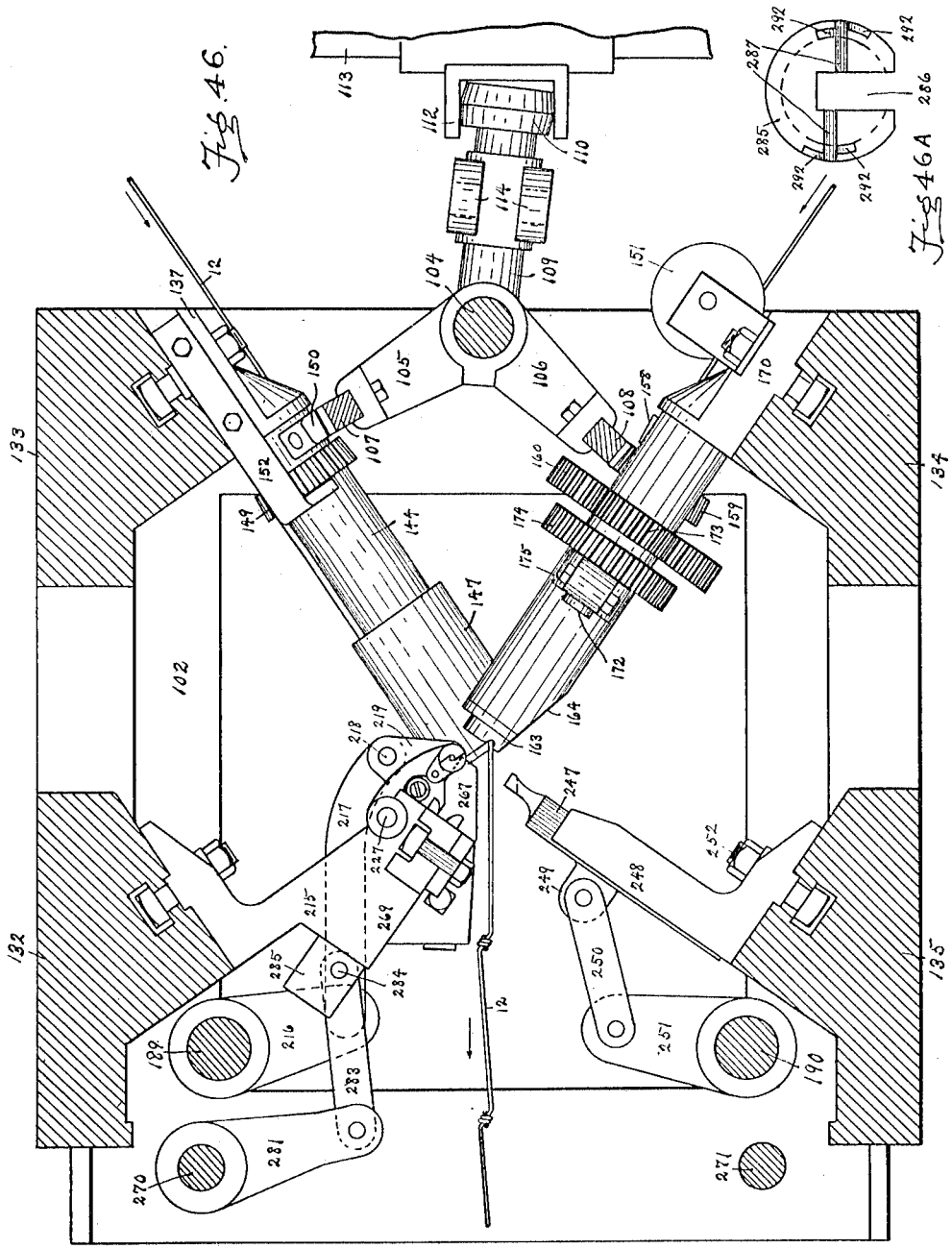

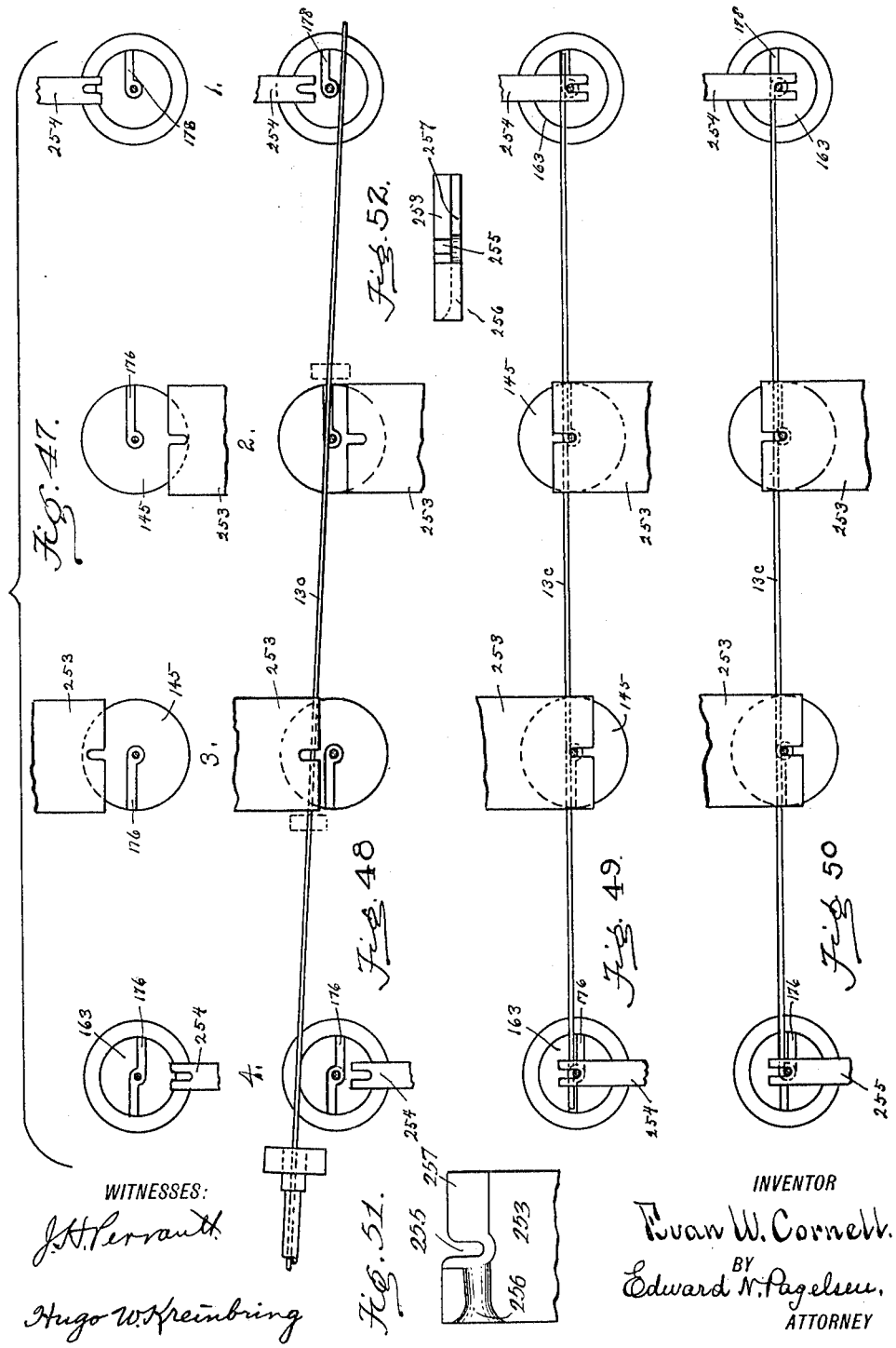

UNITED STATES PATENT OFFICE.

EVAN W. CORNELL, OF ADRIAN, MICHIGAN, ASSIGNOR TO PAGE WOVEN WIRE FENCE COMPANY, OF ADRIAN, MICHIGAN, A CORPORATION OF NEW JERSEY.

FENCE-MACHINE.

1,105,622.   Specification of Letters Patent.   Patented Aug. 4, 1914.

Application filed August 28, 1913. Serial No. 787,158.

*To all whom it may concern:*

Be it known that I, EVAN W. CORNELL, a citizen of the United States, and a resident of Adrian, in the county of Lenawee and State of Michigan, have invented a new and Improved Fence-Machine, of which the following is a specification.

This invention relates to the manufacture of wire fencing consisting of longitudinal and upright members; and its object is to produce a machine which will wind the transverse or upright members around the longitudinal strands in such a manner that there can be no slippage between them.

This invention consists in a machine for securing the transverse or picket wires to the longitudinal strands by winding the picket wires around a plurality of such horizontal wires at points which have been previously bent or kinked so as to be inclined to the general plane of the fabric.

It also consists in a machine provided with means for feeding longitudinal strands through hollow revoluble members, of means for feeding picket wires transversely to the longitudinal wires, of means for cutting off these picket wires into proper lengths, of means for sharply bending a plurality of the longitudinal strands at the points of engagement with the picket wires, of means for winding the picket wires around a plurality of the longitudinal wires intermediate the ends of the picket wires and afterward winding the ends of said picket wires around other longitudinal wires, and in means for holding the picket wires at one side of each strand wire from movement during the winding operations.

It further consists in the details of construction set forth in the accompanying drawings and especially pointed out in the claims.

Figure 17:
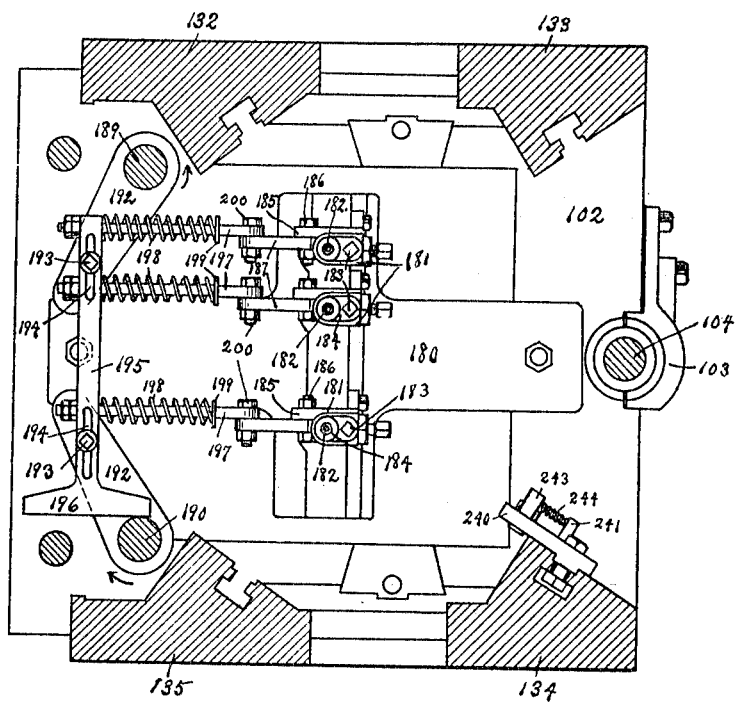
Figure 37:
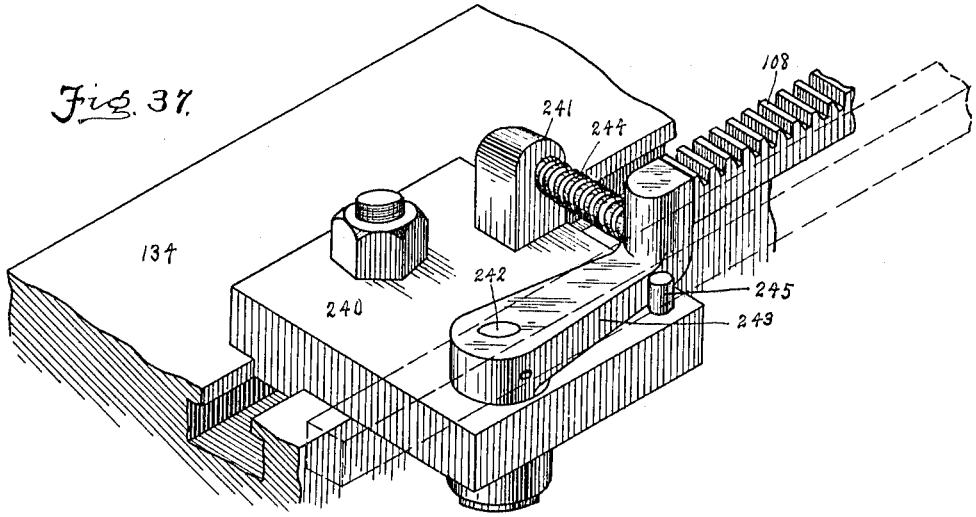
Figure 38:
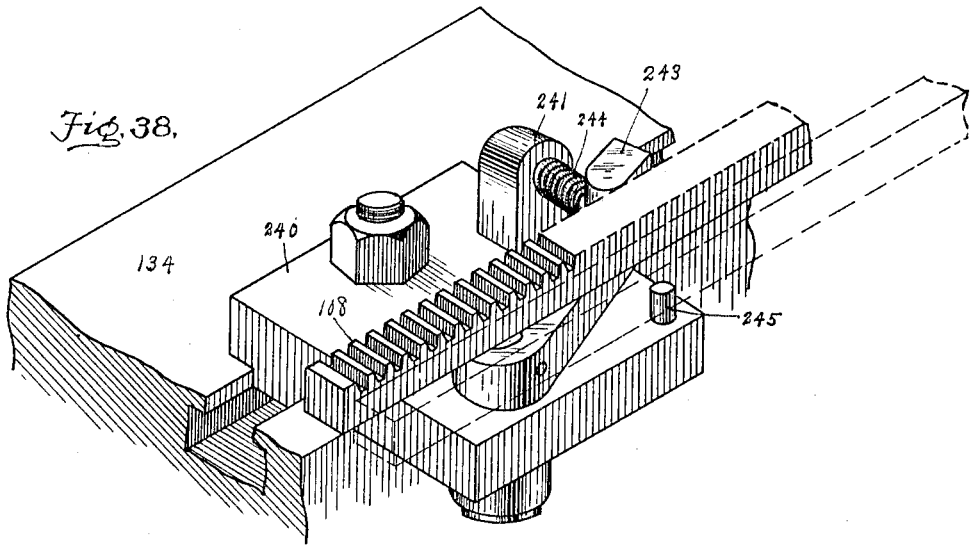

In the accompanying drawings, Figures 1 and 2 constitute a plan of the complete machine, the latter showing the mechanism for feeding the transverse or picket wires. Fig. 1<sup>A</sup> is a plan of a guide for the shifter bar. Fig. 2<sup>A</sup> is a detail of the feeding mechanism on a larger scale. Fig. 3 is a front elevation of the mechanism shown in Fig. 2. Fig. 3<sup>A</sup> is a section on the line A—A of Fig. 2<sup>A</sup>. Fig. 4 is an elevation of the left side of the machine. Fig. 5 is an elevation of the right side of the machine. Fig. 6 is a plan of the gripping mechanism of the wire feeder. Fig. 7 is a section on the line 7—7 of Fig. 6. Fig. 8 is a section on the line 8—8 of Fig. 6. Fig. 9 is a section on the line 9—9 of Fig. 7. Fig. 10 is a section on the line 10—10 of Fig. 9. Fig. 11 is an elevation of the mechanism shown in Fig. 6 viewed from the left. Fig. 12 is an elevation of this same mechanism viewed from the right in Fig. 11. Fig. 13 is a front elevation of a portion of the picket wire manipulating device. Fig. 14 shows the ends of the twisters when in neutral position. Fig. 15 is an end view and Fig. 16 a plan view of a complete picket and the strand wires on which it is mounted. Fig. 17 is a section on the line 17—17 of Fig. 13. Fig. 18 is a plan of the mechanism shown in Fig. 17. Fig. 19 is a section on the line 19—19 of Fig. 13 and shows twisters, a kinker, an anvil and a placer. Figs. 20 and 21 are sections on the lines 20—20 and 21—21 of Fig. 40 respectively. Fig. 22 is an elevation of an anvil, a placer and a shear for the picket wires. Fig. 23 is an end view of the same along the line of the arrow in Fig. 22. Fig. 24 is a view similar to Fig. 22 after the shearing operation has been completed, on the line 24—24 of Fig. 23. Fig. 25 is a diagrammatic view showing the strand wires before kinking and a picket wire across them. Fig. 26 is a view of the strand wire and the severed picket wire after the strand wires have been kinked. Fig. 27 is a view of the same after the picket wire has been wound around two of the strand wires. Fig. 28 is a view of the same after the ends of the picket wire have been wound around the two adjacent strand wires. Fig. 29 is an elevation of the cam for shifting the racks that operate the twisters. Fig. 30 is an elevation of the cam operating the placers. Fig. 31 is an elevation of the cam for operating the kinkers. Fig. 32 is a longitudinal view of the twister adapted for wrapping the ends of two adjacent picket wires around a strand wire. Fig. 33 is an end view of the same. Fig. 34 is a section on the line 34—34 of Fig. 35. Fig. 35 is a longitudinal section of a twister for wrapping the intermediate portions of the picket wires around strand wires. Fig. 36 is an end view of the same. Figs. 37 and 38 show a safety device in two positions. Fig. 39 shows the mechanism shown in Fig. 19 after the kinker has begun its downward movement. Fig. 40 is another view of the same showing the position of the parts after the kinker has completed its downward movement. Fig. 41 is a fourth view of the same showing the parts after the placer has moved upward to bring the picket wire into the slot in the end of the twister so that it may be carried around the strand wire. Fig. 41^A is an end view of the placer shown in Fig. 41. Fig. 42 is a section on the line 42—42 of Fig. 13 showing the parts prior to the movement of the kinker, in what is termed "neutral position." Fig. 43 is a view of the same after the kinker has begun its movement. Fig. 44 is a view of the same after the kinker has completed its movement and the bender has pressed the end of the picket wire down so that it will be out of the way when twisted around the strand wire. Fig. 45 is a section on the line 45—45 of Fig. 13. Fig. 46 is a section on the line 46—46 of Fig. 13. Fig. 46^A is an end view of the placer. Figs. 47 to 50 inclusive are diagrammatic views showing the relative positions of the twisters and kinkers at different stages of operation. Fig. 51 is a view of the inner side of a kinker. Fig. 52 is an end view of the same. Fig. 53 is a detail of the gears for intermittently actuating the picket feeders.

Similar reference characters refer to like parts throughout the several views.

The operation of this machine may be more easily understood by referring to Figs. 25 to 28 inclusive. In Fig. 25, four strand wires 12 and a picket wire 13^a are shown as they have been fed to proper position. In Fig. 26, the picket wire has been sheared and the longitudinal wires or strands have been kinked, two up and two down. In Fig. 27, the length of picket wire has been wound around the two intermediate strands and the end of the next adjacent length 13^b of picket wire has been brought to its proper position. In Fig. 28, the ends of the picket wires have been wound around the outer strands, the adjacent ends of the lengths 13^a and 13^b being wound around the same strand.

By first kinking the strand, a fabric is produced in which the adjacent loops or windings of the pickets are at an angle to each other, and when a strong stress, having a tendency to straighten out the kinks, is placed on the strands, a twisting stress on the loops of the picket wires results, causing these loops to tighten on the strands and thus preventing slippage between the strands and pickets.

Referring now to Figs. 15 and 16, it will be noticed that the parts 13^a and 13^c of the pickets are shown above the strands and the part 13^b below them. While this exact arrangement is merely a matter of choice, it is desirable that the adjacent ends of two different lengths should be on opposite sides of the strand on which they are wound, as shown in Fig. 27.

In order that the strands may be properly kinked in opposite directions, it is desirable that they may be fed to the line of picket, hereafter called the wire line, at different angles, preferably from above and from below the general plane of the finished fabric. The strands pass to the machine from any proper source of supply, preferably higher than the machine, and pass through inclined twisters intermittently, the picket wires passing to the wire line at the same time. The strands may be spaced any desired distance apart, and each of the lengths comprising the pickets is shown to wind on four strands. While any number of strands may be provided for, means are shown to produce a ten-strand fence.

Referring to Figs. 1 to 5 inclusive, 14 and 15 are the side frames of the machine which carry bearings 16 at their front ends for the shaft 17, on which is mounted the drum 18. The finished fabric passes around this drum and thence rearwardly to the winding mandrel 19. Cross frames 20 and 21 support the feeding mechanism for the picket wires and the frame 20 also supports a bracket 23, on which, and on the frames 14 and 15, are bearings for the main shaft 24, on which are tight and loose pulleys 25 and 26. A pinion 22 on this shaft meshes with the gear 27 on the shaft 28, which also carries the miter gear 29 which meshes with the miter gear 30 on the vertical shaft 31. This shaft has a crank 33 on its upper end, to which a rod 34 is connected, whose other end connects to the crank 35 on the upright feed shaft 36. The crank 35 is of longer stroke than the crank 33 so that the shaft 36 is merely reciprocated.

On the transverse frames 20 and 21 are the secondary frames 38 and 39 which support the bracket 40 which carries the upper bearing 41 for the shaft 36, the lower bearing 42 being mounted on the ransverse frame 21. A plate 44 on the auxiliary frame 38 carries the guide rollers 45 for the wires 13^a, 13^b and 13^c, which pass through the straighteners 46 to the feeders, which extend to the right from the auxiliary frame 39, and of which three are shown, mounted on the rods 47. Each rod 47 has a groove 48 in which a guide 49 is slidable and which is provided with an inclined hole 50 for the wire 13. A sleeve 52 is slidable on the rod and connects to the guide 49 by means of rivets 53. Extending from one side of the sleeve is a bracket 54 on which are mounted the bars 55 separated from the bracket by the collars 56, held in place by the bolts 57. A pin 58 extending through the bracket and the bars 55 carries the two links 59 and 60 of a toggle, the inner ends of the links being connected by the pin 62 to the link 63 that engages in a notch in the slidable jaw 64. The opposite jaw 65 is held in position by the plate 66, secured to the lug 67 on the sleeve 52 by means of the bolt 68. The guide 49 is notched, as shown in Fig. 9, to receive these two jaws. A plate 71 holds down the jaws under pressure of the bolt 68.

The toggle is operated and the sleeve is moved along the rod 47 by means of a connecting rod 69 having an up-turned end 70 which carries a set screw 72 (Fig. 8) that may engage the shoulder 73 on the bracket 54 to move the sleeve to the right. An arm 74 on this connecting rod extends over the bracket 54 and receives the pin 62. When the link is moved to the right, the toggle is straightened, forcing the jaw 64 against the jaw 65, gripping the wire 13 between them and carrying it along to the right. On the return stroke, the link 63 is withdrawn, as shown in Fig. 6, and the screw 72 engages the bracket to move the sleeve to the left, the wire 13 sliding freely in the guide 49.

For greater safety, the sleeve may have a lug 75, and a pin 76 on the bracket 54 may carry a dog 77, whose tooth 78 is held away from the wire 13 by the link 81 on its return movement. But when the connecting rod moves the link 59 to the right, it will swing the arm 80 of this link with it, and by means of the slot in the link 81 permit the tooth 78 to swing against the wire 13 under stress of the spring 79, and this wire against the screw 83 carried by this lug 75, resulting in the dog engaging the wire 13 in such a manner that the wire will be moved to the right. When the movement on the link 69 is reversed, the dog will be swung back to the position shown in Fig. 6, by the link 81. The spring 79 swings this dog 77 and tooth 78 into engagement with the wire 13, and holds them there until the shoe moves back.

Mounted on the shaft 36 is a crank arm 85 for each rod 47, on which is slidable a head 86, positioned by the screw 87, which head carries a crank pin 88 on which the connecting rod 69 is mounted, as shown in Fig. 2^A. As the distance between adjacent strand wires of the fence may be varied, the lengths of the picket wires may also vary, which may be provided for by the screws 87 which change the effective movement of the outer ends of the connecting rods 69. As each revolution of the shaft 28 marks a cycle of the machine, it will be noted that the arms 85 swing back and forth with each cycle and each feeds a length of wire to the twisting mechanism.

A shaft 90 extends across the main frame (Fig. 5) and carries an idler gear 91 that meshes with the gear 27 and with the gear 92 on the shaft 93. A mutilated pinion 94 on the opposite end of this shaft 93 (Fig. 4) meshes with the mutilated gear 95 on the shaft 17 and turns the drum 18 one step with each revolution of the shaft 28. The arm 96 of the gear 92 may be slotted to receive the pin 97 in one end of the link 98, the rear end of the link connecting to the crank 99 in the usual manner to turn the winding mandrel 19 step by step.

The picket wires are wound around the strands by means of certain devices, termed twisters, the strands being previously bent sharply by reciprocating bars called kinkers. These strands are supported during the kinking operation by means of anvils, and during the winding of the ends of the lengths of the picket wires, the wires are held against the twisters by means of placers. The construction and operation of the twisters will be explained first.

Mounted on the frames 14 and 15 are two rectangular frames 101 and 102, which support bearings 103 in which the shaft 104 is both revoluble and slidable. Secured to this shaft (see Fig. 19) is a frame comprising upper arms 105, lower arms 106, the upper rack 107 and lower rack 108 carried by the arms 105 and 106, and the rearwardly extending arm 109 having a head 110 between the guides 112 on the upright bar 113, and a collar having the lugs 114, which carry the pin 115 (see Fig. 1) which extends through one end of the link 116. The other end of this link carries a sleeve 117 mounted on the pin 118 on the crank 119 on the shaft 120. This shaft is mounted in bearings on the frame 14, and carries a bevel gear 122 that meshes with the mutilated bevel gear 123 on the shaft 28 (see Fig. 53).

The bar 113 is slidably mounted in the bracket 124 on the frame 102, which bracket also supports the upper bearing of the shaft 31. The lower end of this bar is slidable in the bearing 125 on the frame 15 (Fig. 1^A), and its lower end carries a roller 126 that runs in the groove 127 in the cam 128 on the shaft 28. See Fig. 29. On the link 116 are two collars 129 and 130 which the sleeve 117 engages as it is carried around by the crank-pin 118, which collars are spaced a greater distance apart than the length of the sleeve 117, for reasons which will presently be given.

It will be understood from Figs. 27 and 28 that the lengths of picket wire are first wound around two strands and then around two others. The first winding is caused by the longitudinal movement in one direction of the racks 107 and 108, and the second winding by the reverse movement of the racks. This movement is given the racks, the arms 105 and 106, and the shaft 104 by the crank 119. In the meantime, the shaft 28 is turning with the cam 128 which is so positioned that its inclined portions of the groove 127 pass the roller 126 just after the crank 119 has reached one or the other end of its stroke. During the time that the sleeve 117 is moving from one collar 129 or 130 to the other, the racks are stationary, longitudinally, but during this time they are shifted laterally by the cam 128 so that they disengage one set of twisters and engage the other set.

Extending between the rectangular frames 101 and 102 are bars 132, 133, 134 and 135, each having T slots to receive the bolts that secure the various twisters, kinkers and placers in position. The twisters are of two kinds, those that twist the intermediate portions of the picket wires around the strands and which are given one revolution, and those that twist the ends of the pickets around other strands and which are preferably given two revolutions. The two sets of twisters are preferably mounted as shown in Fig. 19, every other one being secured to the bar 133, and the others to the bar 134, forming two sets in two intersecting planes, the twisters in each plane being parallel to each other.

Referring now to Fig. 35, the short shaft 136 is formed with a foot 137 so that it can be secured to the bars 133—134, and with a groove 138 to permit the passage of the strand. A pin 139 across a slot 140 carries a roller 141 on which the strand runs. The end is furnished with a hard steel guide 143 for the strand. Revoluble on the shaft 136 is a sleeve-spindle 144, having a plate 145 closing its inner end, which plate has an aperture 146 through which the strand passes when the drum 18 is turned.

Mounted on the sleeve is a shell 147, held in position by a brace 148, as shown in Fig. 19, which brace connects to the foot 137. The inner edge of the shell forms a cam against which the end of the picket wire bears as it is being bent around the strand. On the sleeve 144 are the gear teeth 149 and the stop plate 150 which will be engaged by a rack-bar during the stroke that is inoperative so far as that particular twister is concerned. As the wires 12 preferably come from above the machine, a guide roller 151 is preferably mounted adjacent each twister in the lower plane. It will be observed from Fig. 44 that the positions of the gears 149 and stop plate 150 are reversed in the upper plane. The sleeve 144 may be prevented from slipping off the shaft 136 by means of a guard 152, as shown in Fig. 21.

The second set of twisters are shown in Figs. 20, 21 32, and like the first, each has a stub shaft 154 having a foot 155 adapted to be secured to a bar 133 or 134. Sleeves 156 and 157 are revoluble on this shaft, the former provided with stop plate 158 and gears 159 and 160. The latter has the gear 162 and the apertured plate 163. The end of this sleeve 157 has a flat spot 164 to permit the ends of the picket wires to swing into place. The shaft 154 has the groove 165, slot 166, pin 167, wheel 168 and guide 169, found in the stub shafts of the other twisters. Referring to Fig. 21, short brackets 170 will be seen secured to the bar 134, which brackets carry stub shaft 172, on which are mounted the connected gears 173 and 174. Arms 175 secured on the ends of the stub shafts 172 extend toward the sleeves 157 in such a manner that they engage the sides of the gears 162 and hold the sleeves 157 in position. The twisters of Fig. 32 may be termed single, and those of Fig. 35, double. These twisters are in groups of three, the second and third being designed to wind the picket wire intermediate its ends around the strands that extend through these twisters, and the first to wind the ends of adjacent wires around its particular strand. An additional double twister is necessary to take care of the final end of the last picket wire, so that for producing a fence of ten strands, four double and six single twisters would be necessary, and these are shown in the drawings. Their arrangement is shown diagrammatically in Fig. 14, but it should be remembered that the twisters designated by even numbers lie in one plane and the others in another plane. The end plates of all the twisters are so positioned that they will contact with a wire extending along the line of intersection of the planes. As the single twisters are each intended to wind only one part of wire around a strand, they are formed with a short or radial cross groove 176 to receive the part to be wound, while the intermediate double twisters are formed with a long or diametrical cross groove 177. By reason of the gears 160, 173, 174 and 162, the double twisters will be given two revolutions at each cycle. The outer double twisters have radial grooves 178 as they engage only one end of wire.

Comparing Figs. 14, 15 and 16, it will be noticed that the length $13^c$ is first engaged by the twisters 2 and 3; the length $13^b$ by the twisters 5 and 6; and the length $13^a$ by the twisters 8 and 9, and are wound once around the strand that extends through that particular twister. That brings each length to the position shown in Fig. 27. The ends of the different lengths are then engaged by the twisters 1, 4, 7 and 10 and wound twice around the strands extending through these twisters, resulting in a structure as shown in Figs. 15 and 16. By mounting these twisters in the inclined planes, and properly spacing them, the wire $13^b$ can be fed along the bottom of the strands and the wires $13^a$ and $13^c$ along the top, but this can be reversed if desired by simply changing the positions of the twisters. It will be noted that the twisters 2—3, 5—6 and 8—9, form pairs and that they revolve in opposite directions. By mounting them in different planes and engaging the lower side of the gear 149 of one and the upper side of the gear 149 of the other by the rack-bars simultaneously, and moving the rack-bars in one direction, the twisters of each pair revolve in opposite directions. At the end of the stroke, the rack-bars are shifted by means of the cam 128, and then caused to move longitudinally in the opposite direction. When so moving, they engage the gears that drive the double twisters, and therefore turn these double twisters in the same direction as the single twisters next adjacent to them but in the other plane, have just been driven. See Fig. 14. This results in proper winding of the pickets.

As stated before, the picket wires are fed to the twisters by means of the mechanism shown in Figs. 2 to 3$^a$ and 6 to 12 inclusive, and are guided by the rods 47 which extend through the rectangular frame 102 (Figs. 17 and 18) and are secured in the cross-shaped plate 180. Secured to this plate are sockets 181, one for each cross wire, and a guide tube 182 enters each of these sockets, being adjustable therein by means of the set-screw 183 in the collar 184 on the tube. Each socket has a flange 185 that carries a pivot 186 for a gripping lever 187, whose engaging tooth 188 is adapted to press the cross wire against the end of the screw 189$^a$. Two kinker shafts, 189 and 190, to be explained later on, are mounted in the frames 101 and 102, and are swung in the direction of the arrows in Fig. 17 during the winding operation of the twisters. During this time no cross wire should be fed to the twisters. Arms 192 on these shafts carry pins 193, slidable in slots 194 in the upright connector 195, whose lower end forms a shoe 196, slidable on the shaft 190. Rods 197 are slidable in this connector and carry springs 198 that transmit the thrust of the arms 192 to the teeth 188 by means of the collars 199 and pins 200, when the shafts 189 and 190 are moved in the direction of the arrows.

On the gear 27 (Fig. 5) is mounted the cam 202 (Fig. 31) that oscillates the shafts 189 and 190. The groove in this cam has a high part 203, intermediate part 204 and low part 205, and receives the roller 206 on the rod 207 that connects to the pin 208 on the crank arm 209 secured to the shaft 190. Referring to Fig. 13, it will be noted that the crank arms 210 and 211 on the shafts 189 and 190 are connected by the link 213 so that they will reciprocate together.

The cut-off mechanisms for the picket wires 13$^a$ and 13$^c$ are alike, while that for 13$^b$ is modified by securing it to the cross-bar 135 and actuating it by the shaft 190, instead of securing it to the bar 132 and actuating it by the shaft 189. A bracket 215 is mounted on the cross-bar 132 and (Figs. 22, 23, 24 and 46) slidably supports one of the placers, to be explained later on. The wire comes down at an angle so that it will be above the next adjacent twister 144 to the left. A crank arm 216 is connected to the shaft 189 and to one end of the link 217, whose opposite end is mounted on the pin 218 carried by the lever 219. This lever is fulcrumed on the pin 220 on the plate 221, secured to the flange 222 on the bracket 215, into which plate the guide tube 182$^c$ connects. The edge of the lever 219 may be formed with a notch 223 to serve as a shear member, the other member being the plate 221.

The wire is guided as it is fed across the strands by the jaws 224 and 225, the latter pivoted on the pins 226 carried by the former, and the former mounted on the pin 227 revoluble in the bracket 215. The arm 228 connects to the jaw 224 and extends over a pin 230 on the lever 219. The arm 228 has a finger 232 under which one end of the spring 233 extends, which spring is secured to the bracket 215.

When the parts are in the position shown in Fig. 22, the wire 13$^c$ can be slid through the tube 182$^c$ and the hole in the plate 221, until a proper length has been projected. During this time the roller 206 (Fig. 31) is in the part 204 of the cam groove. When the roller reaches the part 203, the arm 216 will have swung from the position shown in Fig. 22 to that of Fig. 24, carrying the upper end of the lever 219 to the right (in Fig. 24), and the notch 223 in this lever down, causing a severing of the wire. This movement of the lever 219 also causes the pin 230 to roll along to the right under the arm 228 and the jaw 224 to rise. The jaw 225 merely falls back and the severed length of wire is released. As the length of the part 203 of the groove of the cam 202 is nearly 180 degrees, the jaws 224 and 225 remain open during substantially the time of the return stroke of the feeders shown in Figs. 2 and 3, that is, during the winding of the cross wires, and during the time the teeth 188 (Fig. 18) engage the cross wires.

Referring to Figs. 1 to 53 it will be seen that the gear 123 is larger in diameter than the pinion 122 on the shaft 120. The proportion is about the same as that of the low part of the cam 128 (Fig. 29) is to the whole circumference. Therefore, the shaft 120 and crank 119 will longitudinally slide the rack-bars back and forth and the cam 128 will move them laterally back and forth during less than half the revolution of the shaft 28, completing the whole movement during the time the roller 206 travels the part 203 of the groove in the cam 202 (Fig. 31).

In order to avoid any accident which might arise out of the sleeve 117 sticking to the rod 116 and thus causing the racks to move longitudinally before being shifted laterally, the device illustrated in Figs. 37 and 38 may be secured to the bar 134 at the ends of the stroke of the rack-bar 108. A plate 240 is secured to the bar 134 and has a lug 241, and a pin 242 on which the movable abutment 243 is pivoted, being held rearwardly by the spring 244. A small pin 245 limits the outward movement of the abutment. The device shown is secured at the right side of the machine when the machine is viewed from the front, and the rack-bar in Fig. 38 is just completing its movement to the left. The views are taken from the rear of the machine.

The rack-bar 108 moves along the path and direction shown in Fig. 21, that is, along the lines indicated in dotted lines in Figs. 37 and 38, until it reaches the right end of its stroke (left in Fig. 21). It is then moved forward and then to the left. In moving forward it moves the abutment 243 from the position shown in Fig. 37 to that in Fig. 38. At the end of the stroke of the rack-bar, the spring 244 swings the abutment across the end of the rack-bar, preventing its return until it is moved laterally to the position indicated by dotted lines. The abutment at the opposite side of the machine is simply reversed, as shown in Fig. 17.

As stated before, the strands are bent sharply or kinked immediately at the front ends of the twisters, and this is performed by means of devices termed kinkers. These are slidable members 247 mounted in dovetailed guides 248, the kinkers 247 having lugs 249, to which are pivoted the links 250 that connect them to the arms 251 on the shafts 189 and 190. Bolts 252 secure the guides to the bars 132 and 135. At the free ends of the kinkers 247 are the notched strand-engaging dies 253 and 254, the former being wide and the latter narrow, as shown in Figs. 47 to 52 inclusive. The wide dies are on the kinkers that are mounted adjacent the single twisters and the narrow dies adjacent the double twisters.

The rear face of each die 253 toward the end of the twister is shown in Fig. 51, which shows the notch 255, the groove 256 and the recess 257. The die shown in Fig. 51 is the same as those in the second vertical row from the left, the die in the third row being similar but reversed. The rear faces of the dies 254 are smooth. When the machine is in neutral position, that is, when the roller 206 is in the part 205 of the cam 202 of Fig. 31, the parts will be as shown in Figs. 19, 42, 45, 46 and 47, and the strands are being moved outwardly to carry the pickets out of line with the kinker dies. It will be observed that the kinkers are entirely removed from the strands, which are straight where they issue from the twisters. On the anvils are guides 290 which lie against the ends of the single twisters, and when the kinker dies are moved to operative position, extend into the notches 257 of the dies 253 and hold the picket wires horizontal so that the benders can force the wire into the small grooves 176 in the end plates 145 of the single twisters, whereupon the twisters again wind the wires around the strands.

The parts remain in neutral position but a short time, and then move to the positions shown in Figs. 39, 43 and 48, while the picket wires are fed across the strands as shown in Fig. 48. At the end of this movement the wire is sheared, and moves into contact with the strand wires, after which the ends are bent back as shown in Fig. 44. The final movement of the kinkers is shown in Fig. 44, which movement carries the wire against the anvils 260 or 260$^a$, carried by the brackets 261 or 261$^a$, on the bars 132 and 135, and kinks the strands. The anvils 267 and 268 of the double twisters are mounted on the sleeves 269 and 270' which support the placers. Immediately afterward the single twisters are actuated and wind the picket wires around their respective strands, at the same time straightening the picket wires and leaving them as shown in Fig. 49.

The arms 251 for the kinkers are alternately on the shafts 189 and 190, and positioned so that each kinker is at substantially right angles to the twister with which it coöperates. Other arms 262 are mounted on these shafts substantially in the planes of the single twisters, and have pivots 263 on which the benders 264 are mounted. The holes 267 in these benders are slotted so that the rear ends of the benders can swing out of the way of the picket wires, when withdrawn. They are guided by the brackets 265 on the anvil brackets 261. A spring 266 holds down the front end of the bender. When the shafts 189 and 190 are turned their final movement from the positions in Figs. 39 and 43 to those of Figs. 40 and 44, these benders are moved from the position in Fig. 43 to that in Fig. 44. These benders will engage those portions of the cross wires at the right and left of the two adjacent single twisters and bend them back so as to extend toward the rear, so that there will be no interference with the next adjacent double twisters, as shown in Fig. 44. When the parts are in the positions shown in Fig. 44, the wire next to the bent portions will be in the grooves 176 of the single twisters, and the parts just beyond the strand are in the grooves 256 in the kinkers, which will prevent the middle portion of the wire from bending when the ends are wound around the strands.

When the picket wires are wound around the strands by means of the sleeves 144, the bent parts of the wires move along the cam edges of the shells 147, and in doing so, are bent out, and when the entire revolution has been made the wire will again be straight. This will bring the parts to the positions shown in Fig. 49. The final movement of the ends of the wires around the strands swings them between the dies 254 and the ends of the double twisters, and the ends will lie in line with the grooves 177 and 178 in the ends of the double twisters. In order to hold these ends in these grooves, the following mechanism is employed. Two shafts 270 and 271 are mounted in the frames 101 and 102, and on their left ends are the crank arms 272 connected by the link 273, so that they will move together. On the right end of the shaft 270 is a crank arm 274 which connects to the rod 275 by means of a pin 276. The opposite end of the rod 275 carries a roller 277 which travels in the groove in the cam 278 connected to the gear 92 on the shaft 93. The high part 279 of this groove is about one third the length of the low portion 280, and when the roller 277 passes to this high portion, the arms 272 move toward each other. On these shafts 270 and 271 are the crank arms 281 and 282 respectively, to which are connected the links 283, the opposite ends of which connect to the pins 284 on the placers 285, slidable in the sleeves 270'. One placer is mounted in line with each of the double twisters, and its rear end is formed with a slot 286 to receive the die 254 of the kinker. Each of the outer placers has a transverse groove 288 to receive and hold the picket wire, while the placers for the intermediate double twisters have two transverse grooves 287, as shown in Fig. 23.

In case the ends of the picket wires are not at proper height with reference to the strands around which they are to be wound, they may be properly positioned by the small horns 292 on the ends of the placers, which are shown in Figs. 39 and 41ª. These placers hold the picket wires against the ends of the twisters during the final winding, the slot 286 permitting them to fit over the dies 254 and anvils 268. Referring to Fig. 22, it will be noticed that the jaws 224 and 225 are pivoted in such a manner that they will be swung up out of the way of the placers 285. There is no wire between these jaws at the time the placers are moved forward.

After the final winding of the ends of the cross wires, the kinkers, placers and benders are withdrawn to neutral position, whereupon the mutilated gear 94 turns the drum 18 one step, at the beginning of which movement the picket is moved out of the wire line. Immediately thereafter, the cross wires are again fed to the strands, the kinkers moved down and bend the strands, the wires are cut, the wires are bent out of line with the double twisters, the single twisters wind them around the proper strands, thereby straightening these wires, the placers move up to hold the ends of the wires in position for the final winding by the double twisters, and the final winding is performed thereby.

Many changes may be made in the details of construction of this machine without departing from the spirit of my invention as set forth in the claims.

I claim.

1. In a fence machine, the combination of a frame, a series of short hollow shafts mounted thereon, revoluble sleeves mounted on said shafts, means to revolve said sleeves intermittently in the same direction and to hold them from turning between revolutions, means to cause fence strands to pass through said shafts, means to feed picket wires across the ends of said sleeves, means to bend the strands at the points of contact with said picket wires and to hold the picket wires against a plurality of said sleeves while said wires are being wound around the strands extending through said sleeves, and means to hold the picket wires against other sleeves while their ends are wound around other strands.

2. In a fence machine, the combination of a frame comprising two parallel bars, a series of short hollow shafts mounted on each of said bars and extending at an angle to the shafts on the other bar, sleeves revolubly mounted on said shafts, means to cause fence strands to pass through said shafts and sleeves intermittently, means to feed picket wires across the ends of said sleeves, means movable at right angles to a plurality of the shafts of each series to bend the strands at the points of contact with said picket wires and to hold the picket wires against the ends of adjacent sleeves while said wires are wound intermediate their ends around the strands extending through said plurality of shafts, means for holding the ends of the picket wires against the ends of the remaining sleeves while said ends are wound around other strands, and means to revolve said sleeves.

3. In a fence machine, the combination of a frame and a series of short hollow shafts mounted thereon in two planes at an angle to each other, revoluble sleeves on said shafts, means to cause fence strands to pass through said shafts, means to feed picket wires across the strands along substantially the line of intersection of the planes, means to hold said wires against the ends of the sleeves, and means to revolve said sleeves intermittently to wind the wires around the strands.

4. In a fence machine, the combination of a frame and a series of short hollow shafts mounted thereon in two planes at an angle to each other, revoluble sleeves on said shafts, means to cause fence strands to pass through said shafts, means to feed picket wires across the strands along substantially the line of intersection of the planes, means to hold said wires against the ends of the sleeves, and means to revolve a series of said sleeves to wind the picket wires around pairs of the strands and then hold them stationary while the remainder of the sleeves are revolved to wind said wires around the other strands.

5. In a fence machine, the combination of a frame and a series of short hollow shafts mounted thereon in two planes at an angle to each other, revoluble sleeves on said shafts, means to cause fence strands to pass through said shafts, means to feed picket wires across the strands along substantially the line of intersection of the planes, means to hold said wires against the ends of the sleeves, and means to revolve two adjacent sleeves of each group of three to wind the picket wires around pairs of strands, and then revolve the remaining sleeve of each group to wind the ends of adjacent wires around the strand extending through said sleeve.

6. In a fence machine, the combination of a frame and four short hollow shafts mounted thereon, revoluble sleeves on said shafts, means to cause fence strands to pass through said shafts, means to feed picket wire across the strands, means to hold said wire against the ends of the sleeves, racks to revolve the two interior sleeves in opposite directions to wind the wire intermediate its ends around two strands and then to revolve the two exterior sleeves in opposite directions to wind the ends of said wire around two other strands, and means to shift said racks.

7. In a fence machine, the combination of a frame, a series of short hollow shafts mounted thereon, revoluble sleeves mounted on the shafts, each having a closed end provided with a transverse groove, means to cause fence strands to pass through said shafts, means to feed picket wires across the ends of said sleeves, means to bend the strands at the points of contact with said picket wires and to hold the picket wires in the grooves in the ends of a series of said sleeves, actuating means to revolve said series of sleeves to wind the picket wires intermediate their ends around the strands extending through said series of sleeves, and means to hold the picket wires in the grooves of the remainder of the sleeves while said remaining sleeves are revolved by the actuating means to wind the ends of the picket wires around the remaining strands.

8. In a fence machine, the combination of a series of hollow revoluble spindles, each in one of two intersecting planes, all the spindles in each plane lying parallel to each other, means to cause fence strands to pass through said spindles, means to feed pickets to said strands along the line of intersection of said planes, means to revolve two of four adjacent spindles in opposite directions to wind a picket intermediate its ends around two adjacent strands, and means to afterward revolve two other spindles in opposite directions to wind the ends of the picket around the strands on each side of the first two.

9. In a fence machine, the combination of a series of four hollow revoluble spindles lying alternately in two intersecting planes, a gear on each of the intermediate spindles, a tight and a loose gear on the outer spindles, a pair of connected gears meshing with the gears on each of the outer spindles, means to draw fence strands through said spindles, means to feed a transverse wire to the line of intersection of said planes, and a pair of rack-bars and a frame to connect the bars, and means to move the rack-bars laterally so that they will mesh with the actuating gears of two of the spindles and to then move the rack-bars longitudinally to revolve said spindles, to then move the rack-bars laterally so that they will mesh with the actuating gears of the two other spindles, and then move them longitudinally to revolve said other two spindles, and thereby wind the transverse wire around said strands.

10. In a fence machine, the combination of a series of four hollow revoluble spindles, a gear on each spindle, means to draw strand wires through said spindles, means to feed a transverse wire to said strand wires, two rack-bars movable to engage two of said gears, means to reciprocate the rack-bars to cause the spindles to wind the transverse wire around two strand wires, means to shift the rack-bars to engage the other two gears so that when moved back by the reciprocating means they will cause the other two spindles to wind the transverse wire around two other strand wires, and means to move said rack-bars into and out of engagement with said gears.

11. In a fence machine, the combination of a frame, a series of revoluble spindles mounted thereon, stationary sleeves mounted around the second and third of each consecutive group of three spindles and each sleeve having its inner end in the form of a cam, means to cause fence strands to pass through said spindles, means to feed picket wires across the strands, means to hold said wire against the ends of said second and third sleeves, means to bend the end portions of said wire at an angle to its intermediate portion and against said cams, racks to revolve the two spindles in opposite directions to wind the wire intermediate its ends around two strands, said cams serving to straighten the wire as it passes around said strands, and means to move said racks so they may revolve the first spindles of the various groups of three to wind the ends of said wires around the strands extending through said first spindles.

12. In a fence machine, the combination of a frame, a series of revoluble spindles mounted thereon, means to cause fence strands to pass through said spindles, an anvil projecting toward each spindle and having a face at an angle to the line of said spindle, means to force the strands against said anvils to bend the same, means to feed picket wires across the strands at the bent portions, and means to revolve the spindles to wind said picket wires around said strands.

13. In a fence machine, the combination of a frame and four revoluble spindles mounted thereon, means to cause fence strands to pass through said spindles, gears on said spindles, means to feed picket wires across the strands, a pair of rack-bars adapted to mesh with said gears, means to move said rack-bars longitudinally to revolve a portion of said spindles, and means to move said rack-bars laterally to move them out of engagement with the gears on a portion of said spindles and into engagement with the other gears so that they may again be moved longitudinally to revolve the remainder of said spindles.

14. In a fence machine, the combination of a frame and a series of hollow spindles mounted thereon in two intersecting planes, a gear on each of said spindles, means to cause fence strands to pass through said spindles, means to feed picket wires across the strands so they will lie in substantially the line of intersection of said planes, means to hold said wire against the ends of the spindles, a frame, a pair of racks mounted on said frame and adapted to engage the gears on said spindles, means to move said racks laterally into and out of mesh with the gears on said spindles, and means to reciprocate said frame to revolve said spindles to cause the same to wind the picket wires around the strands.

15. In a fence machine, the combination of a frame and a series of hollow spindles mounted thereon in two intersecting planes and having transverse grooves across their inner ends, gears on said spindles, means to cause fence strands to pass through said spindles, means to feed picket wires across the strands so they will lie in substantially the line of intersection of said planes, means to hold said wire in the grooves in the ends of the spindles, a frame, a pair of racks mounted on said frame and adapted to engage the gears on said spindles, means to move said racks laterally into and out of mesh with said gears, means to reciprocate said racks to revolve a portion of the spindles in each plane to cause them to wind the picket wires around a portion of the strands, and means to prevent return movement of said racks until they have been swung laterally into engagement with the other set of gears.

16. In a fence machine, the combination of a series of hollow revoluble spindles forming groups of three adjacent spindles each, means to draw fence strands through said spindles, individual mechanism to feed a picket wire to each group, a shear for each feeding device, reciprocating means to revolve the second and third spindle of each group to wind the lengths of picket wires intermediate their ends onto the strands extending through said spindles, and means to shift said reciprocating means into engagement with the first spindle of each group, said reciprocating means thereafter operating to revolve said first spindles to wind the ends of the lengths of the picket wires around the strands extending through said first spindles.

17. In a fence machine, the combination of a series of hollow revoluble spindles lying in two intersecting planes and forming groups of three, said spindles having grooves across their inner ends, means to draw fence strands through said spindles, individual reciprocating means to feed a picket wire to each group, means to engage each wire after it has been fed, a shear for each feeding device, a gear on each spindle, a stationary shaft parallel to the line of intersection of said planes, a frame, means to reciprocate the frame on said shaft, rack-bars mounted on the frame, means to swing the frame to cause the rack-bars to engage a plurality of gears on the spindles in each plane, and means to hold the picket wires in the grooves in the ends of the spindles during the turning of the spindles by the rack-bars so that the wires will be wound around the strands.

18. In a fence machine, the combination of a frame and a series of winders mounted thereon in planes at an angle to each other, adjacent winders being in different planes, means to cause fence strands to pass through said winders, means to feed picket wires across the strands along substantially the line of intersection of the planes, means to hold said wires against the ends of the winders, and means to revolve said winders intermittently to wind the wires around the strands.

19. In a wire fabric machine, the combination of a frame and a series of winders mounted thereon in two planes at an angle to each other and to the plane of the completed fabric, means to cause strands to pass through said winders, means to feed transverse wires across the strands along substantially the line of intersection of the planes, means to hold said wires against the ends of the winders, and means to revolve a series of said winders to wind the transverse wires around pairs of the strands and then hold them stationary while the remainder of the winders are revolved to wind said wires around the other strands.

20. In a fence machine, the combination of a frame and a series of hollow winders mounted thereon, means to cause fence strands to pass through said winders, means to feed picket wires across the strands along the ends of the winders, and means to revolve two adjacent winders of each group of three to wind the picket wires around pairs of strands, and then revolve the remaining winder of each group to wind the ends of adjacent wires around the strand extending through said winder.

21. In a fence machine, the combination of a frame and a series of winders mounted thereon, means to cause fence strands to pass through said winders, means to feed picket wires across the strands, means to hold said wire against the ends of the winders, means to revolve two adjacent winders in opposite directions to wind the wire intermediate its ends around two strands and means to revolve a winder next adjacent each of those already actuated to wind the ends of the wires around two other strands.

22. In a fence machine, the combination of a frame, a series of winders mounted thereon, each having a closed end provided with a transverse groove, means to cause fence strands to pass through said winders, means to feed picket wires across the ends of said winders, means to bend the strands at the points of contact with said picket wires and to hold the picket wires in the grooves in the ends of a series of said winders, actuating means to revolve said series of winders to wind the picket wires intermediate their ends around the strands extending through said winders, and means to hold the picket wires in the grooves of the remainder of the winders while said remaining winders are revolved by the actuating means to wind the ends of the picket wires around the remaining strands.

23. In a fence machine, the combination of a frame, a series of revoluble winders mounted thereon, cams adjacent the second and third of each consecutive group of three winders, means to cause fence strands to pass through said winders, means to feed picket wire across the strands, means to hold said wire against the ends of said second and third winders, means to bend the end portions of said wire at an angle to its intermediate portion and toward said cams, and means to revolve the two winders in opposite directions to wind the wire intermediate its ends around two strands, said cams serving to straighten the wire as it passes around said strands, and thereafter to revolve the first winders of the various groups of three to wind the ends of said wires around the strands extending through said first winders.

24. In a fence machine, the combination of a frame, a series of revoluble wire winders mounted thereon, means to cause fence strands to pass through said winders, an anvil projecting toward each winder, means to force the strands against said anvils to bend the same, means to feed picket wires across the strands at the bent portions, and means to revolve the winders to wind said picket wires around said strands.

25. In a fence machine, the combination of a frame and a series of revoluble wire winders mounted thereon, means to cause fence strands to pass through said winders, gears on said winders, means to feed picket wires across the strands, an actuating member adapted to mesh with said gears, means to move said member longitudinally to revolve a portion of said winders, and means to move said member laterally out of engagement with the gears on a portion of said winders and into engagement with the other gears so that it may again be moved longitudinally to revolve the remainder of said winders.

26. In a fence machine, the combination of a series of hollow revoluble winders forming groups of three adjacent spindles each, means to draw fence strands through said winders, mechanism to feed picket wires to said groups, reciprocating means to revolve the second and third winder of each group to wind the lengths of picket wires intermediate their ends onto the strands extending through said winders, and means to shift said reciprocating means into engagement with the first winder of each group, said reciprocating means thereafter operating to revolve said first winders to wind the ends of the lengths of the picket wires around the strands extending through said first winders.

27. In a fence machine, the combination of a frame and a series of grouped winders mounted thereon, means to cause fence strands to pass through said winders, means to feed picket wires across the strands adjacent the winders, and means to revolve winders of the several groups to wind the picket wires intermediate their ends around the strands passing through such winders, and then revolve other winders positioned between those previously operated to wind the ends of adjacent picket wires around the strands passing through the last operated winders to unite the picket wires into continuous pickets to complete a unitary fabric.

28. In a fence machine, the combination of a frame, a series of revoluble winders mounted thereon, cams adjacent individual winders, means to cause fence strands to pass through said winders, means to feed picket wire across the strands, means to bend the end portions of said wire at an angle to its intermediate portion toward said cams, and means to revolve the winders adjacent the cams to wind the wire intermediate its ends around the strands, said cams serving to straighten the wire as it passes around said strands.

29. In a fence machine, the combination of a frame and a series of grouped winders mounted thereon, means to cause fence strands to pass through said winders, means to feed picket wires across the strands adjacent the winders, and means to revolve a portion of the winders to wind the picket wires around the strands passing through such winders, and then revolve the remaining winders to wind the ends of adjacent picket wires around the strands extending through said winders.

30. In a fence machine, the combination of a frame, means for guiding wire thereto, a rod extending from said frame to the winding mechanism, a shoe slidable on said rod, means to reciprocate said shoe on said rod at each complete actuation of the winding mechanism, gripping devices mounted on said shoe to engage the wire and carry it to the winding mechanism, a dog mounted on said shoe adapted to engage the wire during the feeding movement of the shoe, a spring to move the dog into engagement with the wire, and links connected to the actuating mechanism of the shoe to move the dog out of engagement at the return stroke of the shoe.

31. In a fence machine, the combination of a frame, a series of winders mounted thereon, each formed with wire-engaging means at one end, means to cause fence strands to pass through said winders, means to feed picket wires across the ends of said winders, means to bend the strands at the points of contact with said picket wires and to hold the picket wires in contact with the ends of the winders while being wound thereon, and means to revolve the winders to wind the picket wires around the strands after the operation of the bending means.

In testimony whereof I have signed this specification in the presence of two subscribing witnesses.

EVAN W. CORNELL.

Witnesses:
T. E. OSGOOD,
GEO. L. BENNETT.

---

Copies of this patent may be obtained for five cents each, by addressing the "Commissioner of Patents, Washington, D. C."